United States Patent [19]

Mayer et al.

[11] Patent Number: 4,511,682

[45] Date of Patent: Apr. 16, 1985

[54] WATER-DISPERSIBLE COATING COMPOSITIONS AND PROCESS

[75] Inventors: Walter P. Mayer, Lebanon; Richard J. Burns, Piscataway, both of N.J.

[73] Assignee: Union Carbide Corporation, Danbury, Conn.

[21] Appl. No.: 614,799

[22] Filed: May 29, 1984

Related U.S. Application Data

[63] Continuation-in-part of Ser. No. 508,671, Jun. 28, 1983, abandoned.

[51] Int. Cl.³ .................. C09D 3/52; C09D 3/49; C09D 3/54; C09D 3/58
[52] U.S. Cl. .................... 523/402; 523/423; 524/505; 524/539; 524/590; 525/109; 525/110; 525/117; 525/119; 525/170; 525/185
[58] Field of Search ............... 525/109, 110, 117, 119, 525/170, 185; 523/501, 202, 402, 423; 524/505, 539, 590

[56] References Cited

U.S. PATENT DOCUMENTS

| | | | |
|---|---|---|---|
| Re. 29,028 | 11/1976 | Katsimbas | 525/208 |
| 2,908,663 | 10/1959 | Masters | 525/119 |
| 3,169,945 | 2/1965 | Hostettler et al. | 528/355 |
| 3,198,850 | 8/1965 | Levantin | 525/119 |
| 3,222,420 | 12/1965 | Heppolette | 525/119 |
| 3,243,398 | 3/1966 | Bonzagni | 524/503 |
| 3,300,424 | 1/1967 | Hoenel et al. | 528/245.5 |
| 3,326,864 | 6/1967 | Moore et al. | 525/207 |
| 3,492,254 | 1/1970 | Strand et al. | 524/43 |
| 3,519,604 | 7/1970 | Maurer | 528/112 |
| 3,642,726 | 2/1972 | Heilman | 525/384 |
| 3,689,596 | 9/1972 | Narayana et al. | 525/93 |
| 3,717,557 | 2/1973 | Peterson et al. | 204/159.15 |
| 3,732,337 | 5/1973 | Heilman | 525/57 |
| 3,787,520 | 1/1974 | Labana et al. | 525/117 |
| 3,847,851 | 11/1974 | Tugukuni et al. | 523/202 |
| 3,852,236 | 12/1974 | Heilman | 524/531 |
| 4,025,474 | 5/1977 | Porter et al. | 528/245.5 |
| 4,071,514 | 1/1978 | Ribbecke et al. | 260/404.5 |
| 4,107,113 | 8/1978 | Gibson et al. | 528/245.5 |
| 4,155,957 | 5/1979 | Sasayama | 525/108 |
| 4,211,851 | 7/1980 | Sasayama | 525/108 |
| 4,243,564 | 1/1981 | Mavis | 525/54.26 |
| 4,374,875 | 2/1983 | Fan | 427/386 |

FOREIGN PATENT DOCUMENTS

| | | |
|---|---|---|
| 0017911 | 10/1980 | European Pat. Off. |
| 50-104939 | 9/1975 | Japan |
| 1174344 | 12/1969 | United Kingdom |
| 2102807 | 7/1981 | United Kingdom |

*Primary Examiner*—Ronald W. Griffin
*Attorney, Agent, or Firm*—Bernard Francis Crowe

[57] ABSTRACT

Stable, water-dispersible block copolymer coating compositions are produced from water-indispersible organic polymers having a plurality of hydroxyl groups and water-dispersible organic polymer having a plurality of carboxylic acid anhydride groups by controlled esterification.

51 Claims, No Drawings

WATER-DISPERSIBLE COATING COMPOSITIONS AND PROCESS

CROSS-REFERENCE TO RELATED APPLICATION

This application is a continuation-in-part of U.S. patent application Ser. No. 508,671, filed June 28, 1983, now abandoned.

FIELD OF THE INVENTION

This invention pertains to the production of water-dispersible block copolymer coating compositions and more particularly to the condensation of a water-indispersible, film-forming organic polymer having a plurality of hydroxyl groups with a water-dispersible organic polymer having a plurality of carboxylic acid anhydride groups in the backbone without gelling. This invention also relates to the block copolymer compositions so produced.

BACKGROUND ART

It is well known in the art to employ organic polymers dissolved or dispersed in organic solvents in forming coatings. The formation of coatings using such solvents or dispersions involves the removal of large quantities of organic solvents and, particularly in recent years, such solvent removal has been considered undesirable from ecological and environmental considerations. Accordingly, there has been an increased interest in coatings compositions wherein the organic polymer is dissolved or dispersed in a medium consisting primarily of water. Many such aqueous coating compositions, including those containing amine salts of carboxy groups for increased water-dispersibility, have been unacceptable because reagents introduced during their preparation have deleterious effects on the final coating. For example, vinyl chloride resin latices made by emulsion polymerization require the use of surfactants which remain in the final coating and impart poor water resistance (blush) to the coating. Film-forming polymers made by condensation polymerization, such as epoxy resins, have been rendered water-dispersible by grafting carboxyl-containing monomers thereto using a peroxide catalyst. While these polymers provide satisfactory coatings, the peroxide catalysts used in this process are relatively hazardous materials to store and handle. Another method for producing water-dispersible coating compositions is based on a transesterification reaction between equimolar reaction products, the first of which is a copolymer of a vinyl ester of an alpha-branched acid, styrene, hydroxyalkylester and an alkyl ester of an alpha-beta ethylenically unsaturated acid and the second of which reaction products is in turn a reaction product of trimellitic anhydride and a glycidyl ester of an alpha-branched acid. While water-dispersible coating compositions are obtained from these latter reaction products, the multiplicity of starting materials makes for a difficult preparative process.

It is, therefore, an object of this invention to provide a coating composition which is simple to prepare and economical and which is readily convertible to a water-dispersible composition by neutralization.

It is a further object of this invention to prepare a water-dispersible coating composition which does not present gelling problems during its preparation.

It is a still further object of this invention to prepare a water-dispersible coating composition which is shelf-stable.

Other objects of this invention will become apparent to those skilled in the art upon a further reading of this following specification.

SUMMARY OF THE INVENTION

The above objects have been satisfied by the process of this invention for preparing water-dispersible, block copolymer coating compositions, which process comprises:

(1) forming a reaction mixture comprising (i) a water-indispersible, film-forming organic polymer having an average of at least three hydroxyl groups per molecule (hereinafter referred to as "Reactant A"), (ii) an organic polymer, other than an ethylene-maleic anhydride copolymer, which has an average of at least two carboxylic acid anhydride groups per molecule and which, after hydrolysis and neutralization of at least some of the anhydride groups with a base, is dispersible in water, (hereinafter referred to as "Reactant B"), and (iii) an esterification catalyst:

(2) reacting hydroxyl groups of Reactant A and anhydride groups of Reactant B to form ester groups and carboxy groups, such reaction being conducted to the extent necessary to produce a film-forming composition which, after neutralization of at least some of the carboxy groups with a base, is dispersible in a primarily aqueous medium having a pH over 5; and (3) controlling said reaction to prevent gelation of the composition by incorporating in said reaction mixture water or a low molecular weight organic compound containing one or two groups reactive with said anhydride groups.

The above-described process of this invention provides novel block copolymer coating compositions of this invention, which compositions comprise:

(A) a water-indispersible, film forming, organic polymer component having an average of at least three hydroxyl groups per molecule (hereinafter referred to as "Component I") and (B) an organic polymer component, other than a component derived from an ethylene-maleic anhydride copolymer, which has an average of at least two carboxylic acid groups per molecule and which, after neutralization of at least some of the carboxy groups with a base, is dispersible in water (hereinafter referred to as "Component II")

said composition (a) containing an average of from 0.1 to 3.1 (preferably from 0.5 to 2) ester group(s) per molecule of Component I, which ester group(s) link at least some of Component I to at least some of Component II; and (b) being dispersible in a primarily aqueous medium having a pH over 5 after neutralization of at least some of the carboxy groups with a base.

DETAILED DESCRIPTION OF THE INVENTION

The relative amounts of Component I and Component II present in the compositions of this invention is not narrowly critical. Component I is present in an amount sufficient to insure that the composition is capable of forming a satisfactory coating on a substrate and Component II is present in an amount sufficient to insure that the composition is dispersible in a primarily aqueous medium having a pH over 5 after neutralization of at least some of the carboxy groups with a base.

Preferably, the composition contains Component I and Component II in a weight ratio of from 1:0.01 to 1:1 and more preferably in a weight ratio of from 1:0.15 to 1:0.4. Corresponding amounts of Reactant A and Reactant B are employed in the process of this invention to produce these compositions.

Reactant A employed in the process of this invention is film-forming. As used herein, a "film-forming" material means a material that is capable of being applied to a solid substrate to form a continuous, dry film. Such application is usually effected by casting a film from a solution of the material in a suitable solvent and allowing the film to dry. Film-forming materials are to be distinguished from materials which form liquid films or discontinuous, solid particles under conditions which cause film-forming materials to form dry films.

Reactant A employed in the process of this invention and resultant Component I per se are not dispersible in water. After conversion to salts. Reactant B employed in the process of this invention, resultant Component II and the block copolymer compositions of this invention are dispersible in water. For purposes of this invention, the water-dispersibility and the water-indispersibility of the material is determined by the following test (hereinafter referred to as the "Dispersibility Test."): A solution is prepared consisting of 25 parts by weight of the material being tested and 75 parts by weight of an organic solvent consisting of 0 to 100 wt. % methylethyl ketone and 0 to 100 wt.% of a water-miscible organic solvent(s) in which the material is soluble (e.g., acetone or monobutylethylene glycol). This solution is gradually diluted under vigorous stirring with a mixture of 345 parts by weight of water, 80 parts by weight monobutylethylene glycol (additional organic solvent) and at least sufficient base (e.g., a tertiary amine) to convert 100 mole percent of any carboxy groups present in the material being tested to salt groups. The relative amounts of the material being tested, the total organic solvent, and water present in the resulting aqueous dispersion are 5:26:69. The material is considered to be water-dispersible for purposes of this invention if the dispersion has an average dispersed particle size less than 5 microns and if less than 10 percent by weight of the material in the dispersion is filtered out with a 325 mesh screen. The material being tested is considered to be water-indispersible for purposes of this invention if the dispersion has an average dispersed particle size greater than 5 microns or if more than 10 percent by weight of the material in the dispersion is filtered out with 325 mesh screen. Preferably, water-dispersible materials form dispersions that have an average dispersed particle size less than one micron and/or in which less than two percent by weight of the material being tested is filtered out with 325 mesh screen. Preferably, water-indispersible materials form dispersions that have an average dispersed particle size greater than 10 microns and in which more than 95 weight percent of the material being tested is filtered out with a 325 mesh screen.

The compositions of this invention are dispersible in primarily aqueous media having a pH over 5 after neutralization of at least some of the carboxy groups with a base. When Component I is a vinyl chloride polymer, it is preferable to employ the salts of the composition of this invention in dispersions having a pH of about 5 or even lower in order to reduce the rate of decomposition (primarily dehydrohalogentation) of Component I. Carboxy ions tend to have a stabilizing function in such dispersions. At pHs below to about 5, there are insufficient carboxy ions for stability. Hence at low pHs, the dispersions may tend to become unstable. This instability can be overcome to some extent by adding to the dispersions non-ionic surfactants such as ethoxylated nonyl phenol. The pH of the aqueous dispersions produced in accordance with this invention is primarily governed and controlled by employing sufficient base in the neutralization of the compositions produced by the process of this invention. The preferred pH range for the dispersions is 6 to 9 and the most preferred range is 7 to 8 (except where dehydrohalogenation is of concern).

The following are the preferred and most preferred ranges of number average molecular weights for preferred types of Reactant A and for Reactant B employed in the process of this invention:

TABLE A

| | Molecular Weight Number Average | |
|---|---|---|
| | Preferred Range | Most Preferred Range |
| Reactant A Addition Polymers | | |
| Hydrophilic* | 500 to 35,000 or 50,000 | 3,000 to 35,000 |
| Hydrophobic** | 500 to 6,000 or 20,000 | 3,000 to 5,000 or 15,000 |
| Epoxy Polymers and Phenoxy Polymers | 500 to 50,000 | 3,000 to 40,000 |
| Reactant B | 300 to 30,000 | 800 to 2,500 |

*containing relatively large amounts of hydrophylic groups such as hydroxyl, ester or acetal groups.
**containing relatively few hydroxyl groups and few or no other hydrophylic groups.

The preferred and most preferred molecular weights of Components I and II in the compositions of this invention correspond to the above molecular weights of Reactants A and B, respectively, used in the process of this invention.

It has been found that water-dispersible compositions cannot be formed if the molecular weight of Reactant A is too high relative to the amount of hydrophylic groups present. The maximum molecular weight suitable for forming a water-dispersible composition will vary from one type of polymer to another. Operating within the above molecular weight ranges will usually insure production of a water-dispersible composition.

The preferred mole ratio of hydroxyl groups of Reactant A to anhydride groups of Reactant B in the reaction mixtures used in the process of this invention is from 0.5:1 to 5:1 and the most preferred ratio is from 1:1 to 3:1. The hydroxy groups can be phenolic but preferably they are aliphatic.

Any water-indispersible, film-forming organic polymer containing at least three hydroxyl groups per molecule can be used as Reactant A in the process of this invention. Suitable polymers include addition polymers of ethylenically unsaturated monomers, epoxy polymers, phenoxy polymers, urethane polymers, polyester polymers, phenolic polymers and polyamide polymers.

Illustrative of the addition polymers of ethylenically unsaturated monomers that are useful as Reactant A in the process of this invention are copolymers of ethylenically unsaturated monomers containing a hydroxyl group or a group convertible to a hydroxyl group (hereinafter referred to as "Monomers I") and at least one other ethylenically unsaturated monomer (hereinafter referred to as "Monomers II"). Typical of Monomers I are hydrolyzed vinyl acetate, hydroxyalkyl acrylates or methacrylates having 2 to about 6 carbons in the alkyl groups (e.g., hydroxyethyl acrylate, hydroxyethyl methacrylate and hydroxypropyl methacrylate), alkenols (e.g. allyl alcohol), alkenyl acetals (e.g., vinyl formal), and the like. Typical of Monomers II are vinyl halides (e.g. vinyl chloride), alpha-olefins having 2 to 4 carbon (e.g., ethylene and propylene), alkyl acrylates and methacrylates having 1 to 18 carbons in the alkyl moiety, (e.g. methyl and ethyl acrylate and methacrylate), acrylic and methacrylic acids, alkenyl-substituted aromatic compounds (e.g., styrene, and alpha-methyl styrene), alkenyl alkyl ethers (e.g., methyl vinyl ether and octadecyl vinyl ether) and the like. The preferred addition polymers that are useful as Reactant A are vinyl chloride/vinyl acetate/hydroxyalkyl acrylate or methacrylate terpolymers having 2 to about 6 carbon atoms in the hydroxyalkyl moiety. The most preferred member of this class is a vinyl chloride-vinyl acetate/-hydroxypropyl acrylate copolymer.

When epoxy polymers are reacted with anhydride polymers in the presence of esterification catalysts in an effort to form water-dispersible compositions, stability problems may be encountered. To overcome this instability problem in the practice of the present invention employing epoxy polymers, the epoxide groups can be removed ("capped") by reacting them with a monocarboxylic acid or a monohydric phenol prior to the reaction with Reactant B. Alternately, the epoxy groups can be hydrolyzed to produce less reactive hydroxy groups.

Illustrative of the capped epoxy polymers that are useful as Reactant A in the process of this invention are the reaction products of monocarboxylic acids (including hydroxy-containing monocarboxylic acids) and epoxy polymers, which reaction products are formed by the reaction of the carboxy groups and the epoxy groups under conditions such that the hydroxy groups of the epoxy polymer are substantially unreactive. Typical of suitable monocarboxylic acids and hydroxy-containing monocarboxylic acids are lactic, benzoic, acetic, propionic, butyric, valeric, caproic, caprylic, capric, dimethylolpropionic, palmitic, stearic, oleic, phenylacetic, cinnamic, toluic, dehydrocinnamic and dehydrated castor oil fatty acids. Typical of such monohydric phenols are phenol, butyl phenol, octyl phenol, nonyl phenol, p-phenyl phenol and cresol.

The capping reaction is conducted in the presence of a suitable catalyst (e.g., an amine such as benzylidimethyl amine or a lithium compound such as an organo lithium salt). When the capping catalyst (e.g., an amine catalyst) also catalyzes the reaction of Reactant A and Reactant B, it can be left in the capped epoxide and used for the latter purpose. In the process of this invention, capping introduces an ester or ether group and a hydroxyl group into the polymer. The use of a hydroxy-containing carboxylic acid to cap the epoxy polymer introduces an additional hydroxyl group into the polymer. Such hydroxyl groups should be taken into account as possible coreactants with the anhydride groups in Reactant B.

Typical of one class of epoxy polymers that can be used, as such or (if necessary) after capping, as Reactant A in the process of the present invention are those described in U.S. Pat. No. 4,212,781. The epoxy polymer (epoxy resin) employed may be either aliphatic or aromatic. The most preferred epoxy resins are polyglycidyl ethers of bisphenol A, especially those having 1,2-epoxy equivalency of from about 1.3 to about 2, and preferably about 2. The molecular weight should be from about 350 to about 20,000, and preferably, from about 4,000 to about 10,000. While it is sometimes convenient to use a finished epoxy resin at the desired molecular weight, it is often more practical to start with bisphenol A and the bisglycidyl ether of bisphenol A, which is available from commercial sources. The bisglycidyl ether of bisphenol A, known generally as "liquid epoxy resin", is available in precatalyzed form not only under the trade name "DER-333", containing as the catalyst the complex of ethyl triphenyl phosphonium acetate with acetic acid, but also under the trade name "Epon 829", and these are convenient initial starting materials. Uncatalyzed liquid epoxy resins are also available and have been found to be suitable for use when the proper catalyst is employed.

The precatalyzed liquid epoxy resin, "EPON-829", has the following physical properties:

TABLE B

| Properties of "EPON-829" | |
|---|---|
| Appearance | Clear, viscous liquid |
| Color (Gardner) | 3 max. |
| Weight per Gallon, lbs. (20° C.) | 9.6 |
| Volatiles, (wt. ratio) | Xylene/Monomethyl-ethylene glycol (85/15) |
| Liquid Resin, by weight | 96.5% |
| Viscosity at 25° C. | 40.0 poises |
| Epoxide equivalent weight* | 193–203 |

*Epoxide equivalent weight is the grams of resin containing one gram equivalent weight of epoxide.

To increase the initial molecular weight of a liquid epoxy resin to a level that is more satisfactory for many coating applications, the initial liquid epoxy resin may be reacted not only with additional bisphenol A but also with other materials. Other polyfunctional aromatic alcohols can be used to make the glycidyl ether and to increase molecular weight, including such materials as bis(4-hydroxyphenyl)methane, [bisphenol F]; 2,2-bis-(4'-hydroxy-2',3',5',6'-tetrachlorophenyl) propane; tetrachlorobisphenol A; 4,4-bis(hydroxyphenyl)-pentanoic acid; diphenolic acid; novolacs or low molecular weight phenol-formaldehyde polymers; 1,8-bis(hydroxyphenyl)pentadecane; resorcinol; 2,2,5,5,-tetrakis(4-hydroxyphenyl)hexane; and others. However, the preferred material, for simple practical control over the process, for increasing the weight of the initial liquid epoxy resin, is bisphenol A.

By way of illustration, the ratio of bisphenol A to "EPON-829" used to produce the most desirable molecular weight epoxy polymer is from 65% to 68% by weight "EPON-829" and 35% to 32% by weight bisphenol A to produce polymers having epoxy terminal groups or 59.5 to 62% by weight "EPON-829" and 40.5 to 38% by weight bisphenol A to product polymers having hydroxyl terminal groups. The following table lists the characteristics of the finished epoxy resins resulting from different starting material ratios:

TABLE C

| | Terminal Group in Epoxy Resin | | | |
|---|---|---|---|---|
| | Epoxy | Hydroxy | Epoxy | Hydroxy |
| Starting Material | | | | |
| "EPON-829" (parts by wt.) | 65 | 62 | 68 | 59.5 |

TABLE C-continued

| | Terminal Group in Epoxy Resin | | | |
|---|---|---|---|---|
| | Epoxy | Hydroxy | Epoxy | Hydroxy |
| Bisphenol A (parts by wt.) | 35 | 38 | 32 | 40.5 |
| Epoxy Polymer | | | | |
| Mol. Wt. | 9000 | 9000 | 3500 | 3500 |
| % Epoxy | 1.0 | <0.2 | 2.5 | <0.2 |

The reaction conditions employed to increase the molecular weight of the liquid epoxy resin, or other low molecular weight epoxy resins, include a reaction temperature of about 175° C. and atmospheric pressure. While this reaction can be conducted without a solvent, it is preferred to use ethylene glycol monobutylether at about 15% by weight based on total reaction charge.

Epoxy resins that are useful also can be modified with other condensates such as phenolic resins, phenol, and polyols. Typical modified epoxy resins are: epoxidized polybutadiene; glycidyl ethers formed by reacting phenol novolak resin with epichlorohydrin; 4,4'-isopropylidenediphenol-epichlorohydrin or 4,4-sec-butylidenediphenol-epichlorohydrin reacted with one or more of the following drying oils or fatty acids; beechnut, candlenut, castor (including dehydrated), tung, coconut, corn, cottonseed, fish (refined), hempseed, linseed, oiticia, perilla, poppyseed, pumpkinseed, safflower, sesame, soybean, sunflower, tall oil, and walnut; 4,4'-isopropylidenediphenol-epichlorohydrin chemically treated with one or more of the following: allyl ether of mono-, di-, or trimethylol phenol; 4,4'-isopropylidenediphenol-formaldehyde, 4,4'-sec-butylidenediphenol-formaldehyde, melamine formaldehyde, and urea-formaldehyde. Preferred diepoxide materials, for use in the practice of the invention, are prepared by reacting epichlorohydrin with bisphenol A.

Illustrative of the phenoxy polymers that are useful as Reactant A in the process of this invention are those described in U.S. Pat. No. 3,305,528 and those described in U.S. Pat. No. 3,306,872. The phenoxy polymers of U.S. Pat. No. 3,305,528 are substantially linear, gel-free thermoplastic poly(hydroxyethers) which are the condensation reaction products of a dihydric polynuclear phenol and an epihalohydrin and contain as the recurring units a residue of a dihydric polynuclear phenol having the general formula —O—E—O— wherein E is the nucleus of the dihydric polynuclear phenol in which the hydroxyl groups are attached to different nuclei, or alternatively stated —O—E—O— is the residue obtained by removing the hydroxyl hydrogen atoms of the dihydric polynuclear phenol and a group having the general formula:

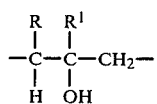

wherein R and R$^1$ (which can be the same or different) are hydrogen or methyl, with the recurring units having the general formula:

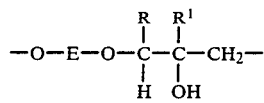

wherein E, R and R$^1$ are as previously defined. The phenoxy polymers of U.S. Pat. No. 3,306,872 are essentially, linear condensation products of dihydric phenols and diepoxides, having certain characteristic properties including high impact resistance as molded, extruded or otherwise formed shapes. They are obtained by reacting a diepoxide and a dihydric phenol in solutions of low water content under controlled conditions and ultimately recovering the product from solution with complete removal of all solvent. Particularly useful compounds are produced according to this invention by the reaction of 2,2-bis(4-hydroxyphenyl)propane and the diglycidyl ether thereof, namely 2,2-bis(2,3-epoxypropoxy-phenyl)propane.

In the event the phenoxy polymers have epoxy groups that cause crosslinking in the process of this invention, the epoxy groups can be capped or hydrolyzed as in the case of epoxy polymers.

Illustrative of the urethane polymers that are useful as Reactant A in the process of this invention are the reaction product of a stoichiometric excess of a polyol with a polyisocyanate. Typical of such polyols are poly(oxyalkylene) polyols, that is alkylene oxide adducts of water or a polyhydric organic compound used as the initiator or starter. Suitable polyhydric organic initiators include the following individually or in combination: ethylene glycol; diethylene glycol; propylene glycol; 1,5-pentanediol; hexylene glycol; dipropylene glycol; 1,2-cyclohexanediol; 3-cyclohexane-1,1-dimethanol; glycerine; 1,2,6-hexane triol; 1,1,1-trimethyolpropane; pentaerythritol; sorbitol; sucrose; alpha-methyl glucoside; and the like. Typical of such polyisocyanates are those represented by the general formula:

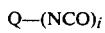

wherein i has an average value of at least 2 and is Usually no more than 6, and Q represents an aliphatic, cycloaliphatic or aromatic radical which can be an unsubstituted hydrocarbyl group or a hydrocarbyl group substituted, for example, with halogen or alkoxy. For example, Q can be an alkylene, cycloalkylene, arylene, alkyl-substituted cycloalkylene, alkarylene, or aralkylene radical including corresponding halogen-and alkoxy-substituted radicals. Typical examples of polyisocyanates which can be used in preparing the polyurethanes are any of the following, including mixtures thereof: 1,6-hexamethylene diisocyanate, 1,4-tetramethylene diisocyanate, phenylene diisocyanates such as 4-methoxy-1,4-phenylene diisocyanate, 4-chloro-1,3-phenylene diisocyanate, 2,4-tolylene diisocyanate, 2,6-tolylene diisocyanate, crude tolylene diisocyanates, and other organic polyisocyanates known to the polyurethane art.

Any organic polymer, other than an ethylene-maleic anhydride copolymer, that contains an average of at least two carboxylic acid anhydride groups per molecule and that is dispersible in water after hydrolysis and neutralization of at least some of the anhydride groups can be used as Reactant B in the process of this invention. Suitable organic polymers are addition polymers derived from ethylenically unsaturated monomers containing anhydride groups such as maleic anhydride, phenyl maleic anhydride, chloromaleic anhydride, dichloromaleic anhydride, itaconic anhydride and aconitic anhydride. The anhydride-containing monomers are usually copolymerized with another ethylenically unsaturated monomer such as Monomers II identified above. Useful as Reactants B are maleated butadiene polymers which are produced by "ENE" addition of maleic anhydride to the tertiary carbon of liquid butadiene. Preferably, Reactant B is a styrene-maleic anhydride copolymer. Particularly preferred copolymers in this class are styrene-maleic anhydride copolymers and styrene-maleic anhydride-maleic anhydride half ester terpolymers commercially available under the designation "SMA", including "SMA-1000" which has a number average molecular weight of about 1600, an acid number of 480 and a styrene to maleic anhydride ratio of 1:1 (on a mole basis). Preferably Reactant B contains from 4 to 12 carboxylic acid anhydride groups per molecule of Reactant B and more preferably it contains from 6 to 9 carboxylic acid anhydride groups per molecule of the Reactant B.

Any esterification catalyst can be used as the esterification catalyst in the process of this invention. Typical of such catalysts are amines, alkali metal hydroxides and mineral acids. Preferred catalysts are trialkylamine catalysts having from 1 to 5 carbon atoms in the alkyl groups as exemplified by triethylamine, tripropylamine, and the like. Such catalysts are preferably used in the process in an amount of from 2 to 40 (more preferably from 4 to 15) mole % per mole of carboxy groups in the reaction mixture.

An organic solvent ("Reaction Solvent") is preferably present in the reaction mixtures used in the process of this invention. Suitable solvents include ketones, hydrocarbons, esters, chlorinated hydrocarbons and the like. The preferred Reaction Solvents are saturated aliphatic ketones having 2 to about 4 carbon atoms in each aliphatic moiety. Exemplary ketones include acetone, methylethyl ketone, ethylpropyl ketone, and methylbutyl ketone, ethylbutyl ketone, and the like. The solvent used preferably is acetone or other solvent which has the following properties:

(1) boils at a low temperature thus minimizing thermal decomposition of Reactant A and Reactant B.

(2) can be easily stripped from the composition of this invention, (3) is not reactive in the reaction mixtures used in the process of this invention, and (4) is water-soluble.

Suitable amounts of Reaction Solvents are from 75 to 500 parts by weight of solvent per 100 parts by weight of Reactant A and B. When a Reaction Solvent is employed in the process of this invention, the product is an organic solvent solution of the composition of this invention. These solutions ("varnishes") are novel and also form part of this invention.

The pressure used in the process of this invention is not narrowly critical and, although it is preferred to use atmospheric pressure for economic reasons, sub-atmospheric as well as super-atmospheric pressures can be used if desired. Any suitable esterification temperature may be used in the process of this invention. Factors to be considered include reactivity of the particular hydroxyl groups in Reactant A (e.g., primary hydroxyls are more reactive than secondary hydroxyls) and the avoidance of temperatures so high that gelation due to side reactions (e.g., the reaction of hydroxy groups with carboxy groups) does not occur. Preferred temperatures are from 50° C. to 120° C. More preferred temperatures are from 60° C. to 70° C. when the hydroxyls in Reactant A are primary hydroxyls and from 105° C. to 120° C. when the hydroxyls in Reactant A are secondary hydroxyls.

After the composition of this invention is produced, it is preferred to substitute a higher boiling solvent ("Coating Solvent") for at least part of the Reaction Solvent. Suitable Coating Solvents include alkyl monoether of glycols and glycol ethers Such Coating Solvents improve the properties of the final coating composition. Exemplary of such glycols and ethers include monobutylethylene glycol, monopropylethylene glycol, monoethylethylene glycol, monomethylethylene glycol, monomethyldiethylene glycol, and monoethylidiethylene glycol, monopropyldiethylene glycol, monobutyldiethylene glycol, and the like. In general, the substitution of solvents ("Solvent Exchange") is effected by volatilizing ("stripping") at least a portion of the Reaction Solvent and then adding the Coating Solvent to the residue. The initial composition can be stripped to just before the point at which viscosity becomes excessive. After stripping and addition of the Coating Solvent, further stripping of any remaining Reaction Solvent can be conducted to achieve a higher solids content. The degree of stripping is governed by the thermal stability of the solids, the desired solids content and the desired final viscosity and flash point. The solutions of the compositions of this invention in the Coating Solvents are novel and also form part of this invention.

Reactant A used in the process of this invention is not dispersible in aqueous media having a pH over 5. The process of this invention is permitted to proceed up to the point where the composition produced (upon conversion to a salt by reaction with a base) becomes dispersible in aqueous media having a pH over 5. This point is conveniently determined by periodically removing small samples of the reaction mixture during the course of the reaction and qualitatively determining the dispersibility properties of the samples by stirring a small quantity of each sample in an aqueous base and visually observing presence or absence of visible particles or coagulated material. The presence of such particles or coagulated material denotes water-indispersibility. The results of this qualitative test (hereinafter referred to as the "Dispersibility Monitoring Test") are in good agreement with the more quantitative Dispersibility Test described above.

Since water-dispersibility is achieved by the formation of ester linkages between Component I and Component II, the point at which dispersibility is achieved can additionally or alternatively be determined by following the loss of carboxyl groups in Reactant B by titration of samples of the reaction mixture with aqueous caustic (titrant) during the reaction. A test for monitoring the formation of ester linkages is the "Ester Group Monitoring Test" described just before the Examples appearing below. With this test data, the number of moles of ester groups formed per Reactant B molecule can then be estimated using the expression:

$$\text{moles of ester groups per Reactant B molecule} = X\left(1 - \frac{\frac{ml_R}{wt_R}}{\frac{ml_C}{wt_C}}\right) \quad \text{EQUATION A}$$

where:

$X$ = number of "potential" COOH groups (i.e., twice the number of anhydride groups initially present in Reactant B plus the number of carboxy groups initially present)

$ml_C$ = milliliters of titrant that reacts with a sample of the reaction mixture at the start of the esterification reaction $ml_R$ = milliliters of titrant that reacts with a sample of the reaction mixture at a given time during the esterification reaction $wt_C$ = weight of the sample reaction mixture at the start of the esterification reaction $wt_R$ = weight of the sample of the reaction mixture that reacts with the titrant at a given time during the esterification reaction If permitted to continue too long, the esterification reaction involved in the process of this invention will result in a gel which is not dispersible in aqueous media. Hence the reaction is controlled so that it proceeds only to a suitable extent (i.e., to produce a composition having suitable dispersibility and aqueous dispersion viscosity).

In the process of this invention, the reaction of the hydroxy groups of Reactant A with the anhydride groups of Reactant B (hereinafter referred to as the "Primary Reaction") is controlled to prevent gelation using water and/or a low molecular weight organic compound containing one or two groups reactive with the anhydride groups of Reactant B (hereinafter referred to as the "Quenchant"). Such control is governed by the fact that the reactive groups provided by the Quenchant consume anhydride groups, thereby slowing down the rate of ester formation between Reactants A and B. Control of the reaction can be effected by adding the Quenchant to the reaction mixture at any time prior to gelation. In the event the Quenchant is added before any reaction has occurred (hereinafter referred to as "Initial Addition Method"), the Primary Reaction begins at a moderate rate and gradually decreases to such a slow rate that the water-dispersible composition produced can be stored for a relatively long time without gelation even though no further steps are taken to control the Primary Reaction. In the event the Quenchant is added after the Primary Reaction has begun (hereinafter referred to as the "Subsequent Addition Method"), the rate of the Primary Reaction is relatively fast up to the point which the Quenchant is added. Thereafter, the rate of Primary Reaction decreases in the same manner as observed in the Initial Addition Method. The amount of the Quenchant employed is not so great as to reduce the rate of the Primary Reaction to such an extent that water-dispersibility of the composition is not achieved within a reasonable time. On the other hand, the amount of Quenchant employed is not so little as to be insufficient to prevent gelation due to the Primary Reaction proceeding too far. When the Initial Addition Method is employed, it is preferred to employ from 1 to about 8 equivalents of reactive groups in the Quenchant per equivalent of anhydride groups in Reactant B. When the Subsequent Addition Method is employed, it is preferred to employ from 5 to 10 or more equivalents of reactive groups in the Quenchant per equivalent of anhydride groups in Reactant B. The relative amount of Quenchant employed is also related to the concentration of the esterification catalyst employed. Increasing the concentration of the catalyst at a given Quenchant concentration increases the rate of the Primary Reaction. Suitable Quenchants include water, monohydric and dihydric alcohols and primary and secondary amines. Illustrative of such alcohols are methanol, ethanol, propanol, butanol, ethylene glycol diethylene glycols, and the methyl, ethyl, propyl and the butyl monoether of ethylene glycol. Illustrative of such amines are methylamine, diethylamine and dimethylamine. Preferably the hydroxy groups in the alcohol Quenchants are primary hydroxy groups. Preferably the Quenchant has a molecular weight of no greater than 200 and more preferably no greater than 120. Preferably, the Quenchant is a monohydric alcohol or a secondary amine because dihydric alcohols and primary amines may result in compositions of this invention having viscosities higher than desired. Most preferably, the Quenchant is water.

As noted above, the compositions produced by the reaction of Component A and Component B are water-dispersible only if a sufficient proportion of the carboxy groups in the compositions (e.g., the carboxy groups formed from the anhydride groups concurrently with the formation of the ester groups) are converted to more hydrophylic groups (e.g., salt groups formed by reaction of the carboxy groups with a base). Such salt formation can be effected by employing an excess of a base as the esterification catalyst in the ester-forming reaction (Primary Reaction). In this case, the catalyst functions both as a catalyst and as a reactant. Preferably, only a catalytic amount of base is added initially and additional base is added to the composition and reacted with the carboxy groups after the Primary Reaction has occurred to make the composition water-dispersible. The neutralized compositions are the novel salts of this invention.

The formation of non-gelled compositions by the reaction of Reactant A with Reactant B in the process of this invention was unexpected because the multiplicity of potential sites for crosslinking in the reaction mixture would ordinarily be expected to lead to a highly gelled (three-dimensional) network. Prior to this invention, it would have been thought that a suitable anhydride-based co-reactant for Reactant A would have to be tailor-made by pretreatment of an anhydride-containing polymer with water to effect hydrolysis of the majority of the anhydride groups. An unexpected aspect of this invention is the discovery that water or other Quenchant can be employed with Reactant A and Reactant B and the Primary Reaction conducted without obtaining a gel because the competing reactions involved are self-controlling.

The compositions and salts of this invention contain block copolymers. As used herein, the term "block copolymer" denotes a material containing at least one block or segment consisting of monomeric units of one or more types and at least one other block or segment consisting primarily of monomeric unit(s) of (a) different type(s). In terms of overall structure, "block copolymer" as used herein includes linear [ABA, AB or $(AB)_n$] and branched(graft) copolymers.

The block copolymer compositions obtained by the process of this invention (and the salts thereof) are complex mixtures because of the multiplicity of possible reactions and the resultant multiplicity of components present after reactions are complete. The composition or salt usually contains a random mixture of unreacted Reactant A, unreacted Reactant B, derivatives of Reactant B where the anhydride groups have been hydrolyzed to carboxy groups (converted to salt groups in the salts of this invention) but not esterified (when the Quenchant is water), ester or amide and carboxy derivatives formed by the reaction of the anhydride groups Reactant B and the Quenchant (when the Quenchant is an alcohol or an amine) and a distribution of species of block copolymers of Component I and Component II having different molecular weights and/or different numbers of linking ester groups and/or different numbers of blocks.

To the extent that Component I and Component II are present in the block copolymer compositions of this invention (or salts thereof) as blocks in block copolymers linked by ester groups, their water-indispersibility, film-forming, water-dispersibility, molecular weight and other properties can be determined by hydrolysis of the ester groups to regenerate polymers corresponding to the blocks. The polymers so formed can be isolated and the properties of the isolated polymers can be determined. The properties of Component I and Component II, when present in the block copolymer compositions of this invention (or salts thereof) as uncombined (unreacted) polymers, can be determined by simply isolating Component I and II and determining the properties of the isolated polymers.

The compositions of this invention can be co-dispersed with other polymers (e.g., additional unreacted Reactant A) and used as, or blended (alloyed) with alkyd, polyurethane, epoxide or latex polymers to form blends which are useful as coatings, inks and adhesives.

The compositions of this invention are also advantageously employed in coating applications in the form of salts in primarily aqueous dispersions (i.e., dispersions wherein the continuous phase is mostly water). Such dispersions preferably contain from 15 to 55 percent by weight (more preferably from 20 to 35 percent by weight) of a salt of a composition of this invention, from 40 to 84 weight percent (more preferably from 50 to 70 weight percent) of water and from 0 to 35 weight percent (more preferably from 5 to 25 weight percent) of an organic solvent for said composition (e.g., the above-described Reaction Solvents, or more preferably, the above-described Coating Solvents). These aqueous dispersions can be formed in any convenient manner (see Example 16 below) and form a part of this invention. Typically, the aqueous dispersions are formed by Solvent Exchanging the above-described Reaction Solvent solutions and then by "letting down" (diluting) the resulting Coating Solvent solutions by mixing such solutions with an aqueous base. The base neutralizes the carboxy groups in the composition and forms a salt that is dispersible in the water-organic solvent mixture.

PROPERTIES OF AQUEOUS DISPERSIONS (A) Viscosity

The initial viscosity of the aqueous dispersions made by the practice of this invention is influenced by the number of ester linkages in the composition of this invention and by the type and nature of the solvents (Reaction Solvents and Coating Solvents) and their mode of addition.

(B) Aging Behavior

Aqueous dispersions prepared by the process of this invention usually remain fluid and uniform, i.e., free of gel, coagulum, sediment or seediness, for at least 3 months at both room temperature and 50° C. provided the pH is not too low. However, varying degrees of downward drift in viscosity and pH have been observed on aging of the dispersions, particularly those containing compositions produced from hydroxy-containing vinyl chloride polymers as Reactant A. Two destabilization mechanisms are probable causes of the latter phenomenon, when Reactant A is derived from vinyl chloride, viz., dehydrochlorination of the vinyl moieties and hydrolysis of the ester linkage. Hydrolysis appears to be relatively minor under mildly acidic or basic conditions, as evinced by the absence of coagulum in dispersions under prolonged storage at 50° C.

(C) Cured Coating Properties

Coatings made from the compositions of this invention using hydroxy-containing vinyl chloride polymers as Reactant A, in common with coatings made from vinyl chloride polymers generally, show a good balance of chemical resistance, flexibility and hardness. Cured coating properties of the various aqueous dispersions of salts of novel compositions of this invention were in the same range as those of solvent-borne vinyl chloride/vinyl acetate/hydroxypropyl acrylate terpolymers corresponding to Reactant A in the novel compositions. Clear, cured coatings of water dispersions of salts of compositions of this invention on solid substrates, such as metal substrates including as aluminum or steel, are made from curable mixtures of this invention comprising the salt-containing compositions of this invention and cross-linking agents. The curable mixtures contain a relative minor amount of the cross-linking agent compared to the amount of the salt-containing composition of this invention. Preferably, the curable mixtures contain about 10 to 20 parts by weight per 100 parts by weight of the salt-containing composition of this invention. Preferably, the curable mixtures are produced by mixing a cross-linking agent and one of the above described-aqueous dispersions of this invention and, in such a case, the curable mixture is a curable aqueous dispersion containing a major amount of water, a minor amount of the salt-containing composition of this invention, a minor amount of the cross-linking agent and, optionally, a minor amount of a organic solvent. Cured coatings are produced on solid substates from the curable compositions of this invention by known cross-linking and coating procedures. If desired, the substrates can be primed by known methods prior to the application of the curable composition thereto. Preferably, the cross-linking agents are melamine-formaldehyde resins (e.g., hexamethoxymethylmelamine), urea-formaldehyde resins, or polyaziridine resins. Curable mixtures of the block copolymer compositions of this invention (or salts thereof) and crosslinking agents are novel and form a part of this invention as do the process of coating substrates therewith and the coated substrates so produced.

The present invention is further illustrated in the numbered Examples which follow. The lettered Examples are presented for purposes of comparison.

In the Examples appearing below, the indicated designations, abbreviations and symbols have the indicated meanings:

| Designation, Abbreviation or Symbol | Meaning |
|---|---|
| °C. | degrees Centigrade |
| °F. | degrees Farenheit |
| g & gm | grams |
| hr. | hour |
| % | percent by weight (unless otherwise indicated) |
| ml | milliliters |
| cP | centipoises at 25° C. |
| Mn | number average molecular weight |
| phr & PHR | parts by weight per hundred parts by weight of polymer (resin) |
| wt | weight |
| ratio | weight ratio (unless otherwise noted) |
| BDMA | benzyldimethylamine |
| Cymel 370 | 88% of solution of hexamethoxymethylmelamine |
| DMEA | dimethylethanolamine |
| DMPA | dimethylolpropionic acid |
| MA | maleic anhydride |
| MEK | methylethyl ketone |
| MIBK | methylisobutyl ketone |
| Reactant A-I | Identified in Example 1 below |
| Reactant A-II | Identified in Comparative Example A below |
| Reactant A-III | Identified in Comparative Examples E & F below |
| Reactant A-IV | Identified in Example 5 below |
| Reactant A-V | Identified in Example 6 below |
| Reactant A-VI | Identified in Example 8 below |
| Reactant A-VII | Identified in Example 15 below |
| Reactant A-VIII | Identified in Example 23 below |
| Reactant A-IX | Identified in Example 31 below |
| Reactant A-X | Identified in Example 32 below |
| Reactant A-XI | Identified in Example 33 below |
| Reactant A-XII | Identified below in Table X |
| Reactant A-XIII | Identified below in Table X |
| Reactant A-XIV | Identified below in Table X |
| Reactant B-I | Identified in Example 1 below |
| Reactant B-II | Identified in Example 7 below |
| Reactant B-III | Identified in Example 21 below |
| Reactant B-IV | Identified in Example 22 below |
| Reactant B-V | Identified in Comparative Examples G & H below |
| Reactant B-VI | Identified in Comparative Example L below |
| Reactant B-VII | Identified in Example 29 below |
| Reactant B-VIII | Identified in Example 34 below |
| Solvent A | monobutyl ether of diethylene glycol |
| Solvent B | monobutyl ether of ethylene glycol |
| Solvent C | monopropyl ether of propylene glycol |
| Reactant A-XV | Identified in Example 43 below |
| TEA | triethylamine |
| THF | tetrahydrofuran |
| VME | vinyl methyl ether |

ESTER GROUP MONITORING TEST

The formation of ester groups linking Component I to Component II during the process of this invention was monitored as follows in some of the Examples appearing below:

I. Reagents
  A. 0.1N NaOH
  B. Thymol Blue dissolved in pyridine (0.1 g in 100 g pyridine)

II. Procedure for Determining Ester Links

1. Weigh out a sample with enough acid groups and anhydride groups in Reactant B to require about 10 ml of NaOH titrant before reaction is run.

2. Add 125 ml of dried acetone.

3. Add 6 drops of indicator.

4. Titrate with NaOH until blue color persists for 30 seconds. Use this amount of titrant as the control.

5. Titrate a sample of reaction mixture or reaction product, recording weight and amount of titrant.

6. To determine the amount of ester links perform the calculations shown in Equation A above.

EXAMPLE 1

The following ingredients were charged in the order listed to a 1-liter reaction vessel equipped with a mechanical stirrer, heating mantle, reflux condenser, and dropping funnel to form an initial reaction mixture. Each ingredient was allowed to dissolve before the next ingredient was added.

| | |
|---|---|
| Acetone | 200 grams |
| Reactant A-I* | 200 grams |
| Reactant B-I** | 40 grams |
| Water | 3.7 grams |

*A vinyl chloride/vinyl acetate/hydroxypropyl acrylate terpolymer having a number average molecular weight of 4,000 containing 2.62 percent hydroxyl by weight of which about 25 percent is primary. This terpolymer contained 20 percent by weight of polymerized hydroxypropylacrylate, 10 percent by weight of polymerized vinyl acetate and 70 percent by weight of polymerized vinylchloride

**A styrene/maleic anhydride copolymer commercially available as "SMA 1000" having a number average molecular weight of 1,600, an acid number of 480 and a styrene:maleic anhydride ratio of 1:1 on a mole basis.

The initial mixture of the above ingredients was heated to its reflux temperature of 59° C. with constant stirring. Upon reaching 59° C., 3.0 grams of triethylamine catalyst were added premixed with 3.0 grams of acetone (0.173 moles of amine were added per equivalent of anhydride in the initial mixture). The reaction mixture was stirred for 35 minutes under reflux conditions.

The extent of the esterification reaction and the dispersibility of the product were monitored periodically during the 35 minutes at reflux by placing one drop of the reaction mixture in a beaker containing a test solution consisting of 10 grams of water, 2 grams of Solvent B, and 0.6 grams of dimethylethanolamine. Prior to esterification, Reactant A-I precipitated from the test solution as a solid phase. After esterification, a drop of the product dispersed completely in the test solution giving a hazy solution free of visible particles or coagulum as determined by visual observation. (This is the "Dispersibility Monitoring Test." This qualitative method of determining water-dispersibility or water-indispersibility was used in Examples 1 to 24.) In this Example, this dispersible state was reached after about 35 minutes under reflux conditions. At this point, 129 grams of Solvent A was added and 196 grams of acetone were distilled off. The resulting product was a pale yellow "varnish". The varnish was stable and could optionally be packaged for later use or immediately dispersed in water.

An aqueous dispersion was prepared by stirring 150 grams of the warm varnish obtained above into 200 grams of water containing 6 grams of dimethylethanolamine and 40 grams of Solvent B. The resulting aqueous dispersion was a translucent liquid having a cream-like consistency. The aqueous dispersion was cast on a glass panel, and air dried to yield a clear, glossy colorless film substantially free of gels or other imperfections.

The initial reaction mixture described above contained the following molar equivalents:

| Group or Compound | Equivalents |
| --- | --- |
| Anhydride | 0.172 |
| Water | 0.206 |
| Amine | 0.0297 |
| Hydroxyl from Reactant A-I | 0.307 |

COMPARATIVE EXAMPLE A

Example I was repeated with the exception that, in lieu of Reactant A-I, there was used a vinyl chloride/vinyl acetate/hydroxypropyl acrylate terpolymer (Reactant A-II) that had a number average molecular weight of about 8000 and that contained 15 percent by weight of polymerized hydroxypropylacrylate, 5 percent by weight of polymerized vinyl acetate and 80 percent by weight of polymerized vinyl chloride. In addition, a longer reaction (reflux) time was used than in Example 1. Reactant A-II contained 1.96 percent by weight of hydroxyl groups of which 25 percent by weight were primary hydroxyl groups. This run was unsatisfactory in that the product did not become water-dispersible in the Dispersibility Monitoring Test. After about 108 minutes of heating at reflux, some of reactant B-I had precipitated, apparently because it formed an acetone-insoluble salt by reaction with the water and the catalyst. These results were obtained because Reactant A-II contained insufficient hydrophylic groups to form a water dispersible composition using the Initial Addition Method. An aqueous dispersion was formed from Reactant A-II using the Subsequent Addition Method as described in Examples 26, 27 and 28 below.

COMPARATIVE EXAMPLE B

Example 1 was repeated except that the water content was slightly higher and the amine content was significantly higher. The following starting materials were used:

| Reaction Mixture | |
| --- | --- |
| Component | Amount (grams) |
| Solution of Reactant A-I: | |
| Reactant A-I* | 100 |
| Acetone | 100 |
| Water | 0.9 |
| Reactant B-I* | 20 |
| Water | 1.64 |
| Catalyst Solution: | |
| Triethylamine (TEA) | 4.89 |
| Acetone | 4.89 |

*Identified in Example 1

Procedure

The ingredients, except catalyst solution, were charged to flask and brought to reflux at 60° C. The catalyst solution added over period of 35 minutes. The product was dispersible in 5% DMEA solution five minutes after catalyst solution was added. Three minutes later, system was gelled.

| Constants: | |
| --- | --- |
| Equivalents of OH Groups | 0.176 |
| Equivalents of Anhydride Group | 0.086 |
| Equivalents of Water | 0.141 |
| Equivalents of TEA | 0.048 |
| Water as % of Anhydride Groups | 164 |
| TEA as % of Acid Group | 29 |

The product gelled because there was insufficient water (Quenchant) present to control the reaction at the relatively high catalyst concentration employed.

COMPARATIVE EXAMPLES C & D

All ingredients, except the catalyst mixture, were charged to a flask and brought to reflux. The catalyst mixture was then added. Periodically samples were tested for dispersibility in 5% DMEA solution.

| | Reaction Mixture | |
| --- | --- | --- |
| | Amount | |
| Component | C (grams) | D (grams) |
| Solution of Reactant A-II | | |
| Reactant A-II* | 200 | 230 |
| Acetone | 300 | 345 |
| Water | 2.45 | 2.82 |
| Reactant B-I | 40 | 46 |
| Water | 3.0 | 0.72 |
| Catalyst Solution | | |
| Triethylamine (TEA) | 3.0 | 3.9 |
| Acetone | 3.0 | 3.9 |
| Constants: | | |
| Equivalents of OH Groups | 0.236 | 0.271 |
| Equivalents of Anhydride Groups | 0.171 | 0.197 |
| Equivalents of Water | 0.303 | 0.197 |
| Equivalents of TEA | 0.030 | 0.039 |
| Water as % of Anhydride | 177 | 100 |
| TEA as % of Acidity | 17 | 20 |
| Time at Reflux | 71 min. | 227 |
| Water Dispersibility | None | None |

*Identified in Comparative Example A

In Comparative Examples C and D, the products were not water-dispersible because Reactant A-II contained insufficient hydrophylic groups in relation to its molecular weight to form a water dispersible composition using the Initial Addition Method. An aqueous dispersion was formed from Reactant A-II using the Subsequent Addition Method as described in Examples 26, 27 and 28 below.

COMPARATIVE EXAMPLES E & F

The general procedure of Comparative Examples C & D were followed, the following starting materials were used:

| Reaction Mixture | | |
|---|---|---|
| | Amount | |
| Component | E (grams) | F (grams) |
| Solution of Reactant A-III: | | |
| Reactant A-III* | 240 | 180 |
| Acetone | 560 | 420 |
| Water | 4.8 | 3.6 |
| Reactant B-I | 48 | 72 |
| Water | 3.8 | 1.7 |
| Catalyst Solution: | | |
| Triethylamine (TEA) | 4.5 | 24.8 |
| Acetone | 4.5 | 24.8 |
| Constants: | | |
| Equivalents of OH Groups | 0.324 | 0.243 |
| Equivalents of Anhydride Groups | 0.205 | 0.308 |
| Equivalents of Water | 0.477 | 0.294 |
| Equivalents of TEA | 0.044 | 0.246 |
| Water as % of Anhydride | 233 | 95 |
| TEA as % of Acidity | 22 | 80 |
| Time at Reflux, minutes | 84 | 110 |
| Water-Dispersibility | None | None |

*Reactant A-III is a terpolymer containing 91 percent by weight of polymerized vinyl chloride. 3 percent by weight of polymerized vinyl acetate and 6 percent by weight of polymerized vinyl alcohol. This terpolymer had a molecular weight of about 15,000.

In Comparative Examples E and F, the products were not water-dispersible because Reactant A-III contained insufficient hydrophylic groups in relation to its molecular weight to form a water dispersible composition using the Initial Addition Method. An aqueous dispersion was formed from Reactant A-III using the Subsequent Addition Method as described in Example 30 below.

COMPARATIVE EXAMPLES G AND H

The following ingredients were charged to a flask:

| | G (grams) | H (grams) |
|---|---|---|
| Solution of Reactant A-I | | |
| Reactant A-I* | 300 | 300 |
| Acetone | 300 | 300 |
| Solution of Reactant B-V | | |
| Reactant B-V (identified below) | 3 | 20 |
| Acetone | 4.5 | 30 |

*Identified as Example 1.

Reactant B-V is commercially available as "EMA 1103" and is a copolymer of ethylene and maleic anhydride in a 1:1 molar ratio having a number average molecular weight of 8000.

When the solutions of A-I and B-V were combined, the polymer blend coagulated.

These Examples illustrate the inoperability of ethylene-maleic anhydride copolymers in the process of this invention.

EXAMPLES 2, 3 & 4

The general procedure of Example 1 was repeated using different catalyst concentrations. The following starting materials were used:

| Reaction Mixture | | | |
|---|---|---|---|
| | Amount | | |
| Component | 2 (grams) | 3 (grams) | 4 (grams) |
| Solution of Reaction A-I: | | | |
| Reactant A-I* | 100 | 100 | 100 |
| Acetone | 100 | 100 | 100 |
| Water | 0.86 | 0.86 | 0.86 |
| Reactant B-I* | 20 | 20 | 20 |
| Water | 0.98 | 0.98 | 0.98 |
| Catalyst Solution: | | | |
| Triethylamine (TEA) | 1.5 | 0.75 | 0.38 |
| Acetone | 1.5 | 0.75 | 0.38 |
| Constants: | | | |
| Equivalents of OH Groups | 0.176 | 0.176 | 0.176 |
| Equivalents of Anhydride Groups | 0.086 | 0.086 | 0.086 |
| Equivalents of water | 0.102 | 0.102 | 0.102 |
| Equivalents of TEA | 0.015 | .0076 | .0038 |
| Water as % of Anhydride | 120 | 120 | 120 |
| TEA as % of Acidity | 8.6 | 4.3 | 2.2 |
| Time to Reach Dispersible Stage, minutes | 30 | 70 | 164 |
| Total time at Reflux, minutes | 82 | 139 | 229 |
| Condition | no gel | no gel | no gel |

*Identified in Example 1

In Examples 2, 3 and 4, all the compositions produced were water-dispersible as contrasted to the gel produced in comparative Example B above. These results illustrate the importance of having a proper relationship between the catalyst concentration and the Quenchant concentration. In Examples 2, 3 and 4 the catalyst concentration was reduced while holding the Quenchant level constant. Hence the Primary Reaction (esterification reaction) rate, as measured by the time required to reach a water-dispersible state, slowed. At lower catalyst concentrations, less Quenchant is desirable to maintain a reasonable reaction time. Conversely, at high catalyst levels, a greater concentration of Quenchant is required to moderate the esterification (grafting) reaction to avoid gellation.

EXAMPLE 5

To a 500 ml. reaction vessel equipped with agitator, thermometer, condenser, and heating mantle, were added 310 g of a solution of Reactant A-IV*, 30 g of Reactant B-I, and 2.8 g of water. Heat and agitation were applied. After ½ hour, the styrene/maleic anhydride polymer had dissolved and 2.25 g triethylamine dissolved in 2.25 g acetone were added. Heating was continued at reflux, 60°–61° C., and after 15 minutes the reaction product was found to be dispersible in a solution of water/Solvent B/dimethylethanolamine, (5/1/0.28 weight ratio). The product (varnish) was heated for an additional 17 minutes to remove 64 g of solvent by distillation.

*The solution contained 48.4% of Reactant A-IV, 47.1% of acetone and 4.5% of MIBK. Reactant A-IV contained 53.9 mol.-% polymerized methylmethacrylate, 28.6 mol.-% polymerized butyl acrylate, 17.5 mol.-% polymerized hydroxypropylacrylate (Mn=4880).

An aqueous dispersion was prepared by stirring 200 g of the warm varnish into 200 g of a solution of water/Solvent B/dimethylethanolamine (5/1/0.28 weight ratio). The resulting stable waterborne product had the following properties:

| pH = | 8.4 | (Brookfield RVT, |
| Viscosity = | 510 Cp | T-A spindle 100 |
| % Solids = | 35.1 | rpm) |

EXAMPLE 6

To a 1-liter reaction vessel equipped with agitator, thermometer, condenser, and heating mantle, were added 100 g Reactant A-V (a polymer consisting of 80 wt. % polymerized vinyl butyral 18.5 wt. % polymerized vinyl alcohol and 1.5 wt. % polymerized vinyl acetate and having $M_n = 38,000$), 40 g Reactant B-I, 400 g tetrahydrofuran (THF) and 6.1 g water. After heating and stirring for 20 minutes, the resins were dissolved and 8.0 g triethylamine were added. Heating was continued under reflux, 67 C., with a small sample being tested periodically for dispersibility in water/Solvent B/dimethylethanolamine (5/1/0.28 weight ratio). After one hour, 2.0 g benzyldimethylamine was added as an additional catalyst. After 8½ hours an additional 10 g of Reactant B-I and 30 g THF were added and heating continued an additional 6½ hours at which time a small sample of the product so formed (varnish) was found to be dispersible in water/Solvent B/dimethylethanolamine (5/1/0.28 weight ratio) after stirring for 2 hours.

A coarse aqueous dispersion was prepared by mixing 250 g of the warm varnish with 200 g of water/Solvent B/dimethylethanolamine (5/1/0.28) using a Cowles Dissolver. Most of the THF was removed by distillation in a distillation flask. Distillation was stopped after the temperature of the material in the flask reached 93° C. Properties of the final waterborne product (aqueous dispersion) were:

| pH = | 8.5 | (Brookfield, RVT, |
| Viscosity = | 150 cp | #2, 100 rpm) |
| % Solids = | 27.9 | |

A less coarse aqueous dispersion might be obtained from the varnish by employing a more suitable Coating Solvent.

EXAMPLE 7

To a 500 ml. reactor equipped with agitator, thermometer, condenser, and heating mantle, were added 349 g of a 43% solution of Reactant A-I in acetone, 30 g of Reactant B-II [a 1:1 mole ratio copolymer of vinyl methyl ether and maleic anhydride having a specific viscosity (1 g copolymer/100 ml. MEK) of 0.11 and having a number average molecular weight of 20,000±7,000] and 3.0 g of water. After heating and mixing to obtain a uniform solution, 4.5 g triethylamine in 4.5 g acetone were added at which point color changed from light amber to brilliant violet. Heating and mixing were continued at reflux, 62 C. After 20 minutes a small sample was found to be dispersible in a solution of water/and Solvent B/dimethylethanolamine in a 5:1:0.28 weight ratio. After reacting for an additional 38 minutes, 100 grams of acetone were removed by distillation to produce a varnish as a residue.

An aqueous dispersion was prepared by stirring 50 g of the warm varnish into 100 g (in two 50 g increments) of the 5/1/0.28 (weight ratio) water/Solvent B/dimethylethanolamine solution and then adding (in two increments) 350 g water. The resulting stable waterborne product had the following properties:

| pH = | 8.6 | (Brookfield RVT, |
| Viscosity | | #5 Spindle, 100 |
| Initial = | 600 cP | rpm) |
| Six Days = | 72 cP | |
| % Solids = | 6.5 | |

The initial reaction mixtures of Examples 5 to 7 contained the following molar equivalents and relative molar water and amine levels:

| | 5 | 6 | 7 |
|---|---|---|---|
| Equivalents | | | |
| Hydroxyl | 0.231 | 0.432 | 0.308 |
| Anhydride | 0.109 | 0.145 | 0.17 |
| Water | 0.156 | 0.34 | 0.56 |
| Amine | 0.022 | 0.079 +0.015 | 0.045 |
| Levels | | | |
| Water as % of Anhydride | 143 | 234 | 330 |
| Amine as % of acidity (carboxy) | 10 | 33 | 13 |

EXAMPLE 8

Capping

To a 1 liter reaction vessel equipped with agitator, thermometer, condenser, and heating mantle, were added 300 grams of Reactant A-VI (identified below), 21.8 grams of dimethylolpropionic acid, and 30 grams diacetone alcohol. Reactant A-VI is the reaction product of epichlorohydrin and Bisphenol A, has an epoxy equivalent weight of 1857, has a number average molecular weight of 3714 and is commercially available as "Epon 1007". Heat was applied without stirring until the resin became fluid enough to stir. At 140° C., 1.6 grams of benzyldimethylamine (BDMA) as a capping catalyst were added dropwise with agitation. The ingredients were heated to 175° C. in six minutes and held between 165° C. and 175° (capping reaction temperature) for 38 minutes. Analysis showed 93.5% that of the original oxirane functionality had been consumed. The epoxy content of the capped epoxide polymer was determined by ASTM D-1652 (methylene chloride substituted for chlorobenzene/chloroform). The acid number of the capped epoxide was 3.5.

Primary Reaction

Sixty grams of diacetone alcohol were added slowly to the hot capped epoxy polymer to lower its temperature to 129° C. Then 35 grams of acetone were added, which further lowered its temperature to 78°. At this point, 5.5 grams of water were added, followed by 120 grams of a 50% acetone solution of Reactant B-I. The ingredients were stirred at reflux (75° C.). The esterification reaction was monitored periodically by placing a large drop of the reaction mixture into a beaker containing 10 grams of water, 2 grams of Solvent B, and 0.6 grams of dimethylethanolamine. Prior to esterification, the epoxy resin precipitated. After esterification, the drop of product (varnish) dispersed completely giving a hazy solution free of visible particles or coagulum. The dispersible state was reached in about 90 minutes at which point an additional 18 grams of water were added to quench the reaction and to produce a varnish. An aqueous dispersion was prepared by stirring 200 grams of the warm varnish into 300 grams of a solution of water/Solvent B/dimethylethanolamine in a 5:1:0.28 weight ratio.

EXAMPLE 9

The procedure of Example 8 was repeated except that the capping reaction was conducted at 160° C. for 30 minutes at which point 92.7% of the original oxirane functionality had been consumed: 60 grams instead of 35 grams of acetone were added and only 3.2 grams of water were added prior to the addition of the Reactant B-I. After 55 minutes at reflux (70° C.), the Primary Reaction was discontinued. A water dispersible stage had been reached and a varnish had been produced. An aqueous dispersion was prepared by stirring 204 grams of the warm varnish into 300 grams of a solution of water/Solvent B/dimethylethanolamine (5/1/0.28 ratio by wt).

EXAMPLE 10

The procedure of Example 8 was followed except for the following changes: Xylene was used instead of diacetone alcohol in the capping reaction, 50 grams of MIBK were used instead of 60 grams of diacetone alcohol for diluting the capped epoxide, and 23 grams of water were added prior to the addition of Reactant B-I. A water-dispersible state was reached after refluxing at 73° C. for approximately 70 minutes. Heating was continued to strip 54 grams of acetone before adding 83 grams of Solvent B to produce a varnish. An aqueous dispersion was prepared by stirring 204 grams of the varnish with 200 grams water/Solvent B/dimethylethanolamine (5/1/0.28). While this experiment shows that a solvent other than diacetone alcohol (a water-soluble solvent) can be used as the capping solvent, water-soluble solvents are preferred because of the superior film-forming properties of the resulting dispersions.

EXAMPLE 11

The procedure of Example 10 was followed except for the following changes: Only 16.4 grams of DMPA were used in the capping reaction and, after 75 minutes at 173° C., 91.1% of the initial oxirane groups had been consumed and only 4.6 grams of water were added prior to adding Reactant B-I. A water-dispersible state was reached in about 100 minutes at reflux (72°) after which 62 grams of distillate were removed being replaced by 75 grams of Solvent B to form a varnish. An aqueous dispersion was prepared by stirring 200 grams of this varnish with 300 grams of water/Solvent B/dimethylethanolamine (5/1/0.28 weight ratio).

EXAMPLE 12

Capping

To the same reaction vessel as in the above Examples 8 to 11 were added 300 grams of Reactant A-VI (identified Example 8) and 45.5 grams of dehydrated castor oil acids ("9–11 Acids"). Heat was applied without stirring until the resin became fluid enough to stir. At 156° C., 1.6 grams BDMA were added dropwise and the reactants heated to 175° C. After 35 minutes, acid number was 1.3, and 94.9% of the original oxirane content had been consumed.

Primary Reaction

Sixty grams of diacetone alcohol were added slowly followed by 60 grams of acetone. At 70° C., 3.2 grams of water were added followed by 120 grams of a 50% acetone solution of Reactant B-I and 100 grams of diacetone alcohol. Heat was applied and 87 grams of distillate removed. Temperature of the reactants at this point was 110°. Reflux was maintained at this temperature for 90 minutes at which point water dispersibility was obtained. Twenty grams of water were added to convert remaining anhydride groups to acid and to form a varnish. An aqueous dispersion was prepared by vigorously stirring 200 grams of the above varnish with 450 grams of water/Solvent B/dimethylethanolamine (5/1/0.28 weight ratio).

EXAMPLE 13

The procedure of Example 12 was followed except that 4.6 grams of water were added prior to the addition of Reactant B-I and 100 grams Solvent B were added instead of diacetone alcohol prior to the removal of 89 grams of distillate. A water dispersible state was reached in 40 minutes at 110° C. Heating was discontinued after an additional 30 minutes and a varnish was so produced. An aqueous dispersion was prepared by stirring 200 grams of the latter varnish with 250 grams of water/Solvent B/dimethylethanolamine (5/1/0.28 weight ratio).

EXAMPLE 14

The procedure of Example 8 was followed except for the following change: 1.76 grams of a aqueous solution containing 2% of lithium in the form of an organo lithium salt ("Pentecat W-2") was used instead of BDMA as the capping catalyst. After 30 minutes at 175° C., analysis showed that 92.6% of the original oxirane functionality had been consumed. Heating was continued an additional 33 minutes before diluting and cooling; 60 instead of 35 grams of acetone were added. 3.0 grams of triethylamine (TEA) were added to catalyze the Primary Reaction. After 2 hours at reflux (69° F.), another 3.0 grams of TEA were added. The product (varnish) became water dispersible after another 37 minutes. No additional water was added. An aqueous dispersion was prepared by stirring 200 grams of the warm varnish into 400 grams of a solution of water/Solvent B/dimethylethanolamine (5/1/0.28 ratio by wt) and 100 grams water.

COMPARATIVE EXAMPLE I

To a 1-liter reaction vessel equipped with agitator, thermometer, condenser, and heating mantle, were added 200 grams of Reactant A-VI, 200 grams acetone, 40 grams Reactant B-I, and 3.1 grams of water. The ingredients were stirred for an hour at reflux (58° C.) to dissolve them before adding 3.5 grams triethylamine mixed with 3.5 grams acetone. Stirring at reflux was continued for 58 minutes at which point a drop of the resin was found to be dispersible in the test solution comprising 10 grams water, 2 grams Solvent B, and 0.6 grams dimethylethanolamine. 1.5 grams of water were added to quench and heating was continued to strip 120 ml acetone before adding 89 grams Solvent B. Another 40 grams acetone were stripped before discharging the varnish so produced. An aqueous dispersion was prepared by stirring 200 grams of the warm varnish into 285 grams of a solution of water/Solvent B/dimethylethanolamine (5/1/0.28). The dispersion gelled in 3 days at room temperature.

SUMMARY OF RESULTS

Examples 8 to 14 and Comparative Example I are summarized in Table I.

The properties of the aqueous dispersions from Examples 8 to 14 and a commercially available waterborne epoxy polymer ("Epoxy-1") for coating aluminum, two piece, beverage cans are as follows:

TABLE I

| Example | Capping & Primary Reaction Molar Ratio of Reactants | Primary Reaction Equivalents Water/Anhydride | Primary Reaction Temp °C. | Primary Reaction Time min. | Product of Primary Reaction Water Dispersible | Product of Primary Reaction Water Stable** |
|---|---|---|---|---|---|---|
| | Reactant A-VI/DMPA/Reactant B-I | | | | | |
| 10 | 1/2/0.47 | 5.0 | 73 | 70 | Yes | Yes |
| 8 | " | 1.2 | 75 | 90 | Yes | Yes |
| 9 | " | 0.7 | 70 | 55 | Yes | Yes |
| 14 | " | 1.2 | 69 | 155 | Yes | Yes |
| 11 | 1/1.5/0.47 | 1.0 | 72 | 100 | Yes | Yes |
| | Reactant A-VI/9-11 Acids/Reactant B-I | | | | | |
| 13 | 1/2/0.47 | 1.0* | 110 | 40 | Yes | Yes |
| 12 | | 0.7 | 110 | 90 | Yes | Yes |
| 1# | Reactant A-VI/Reactant B-I,1/0.47 | 1.0 | 58 | 58 | Yes | No |

*Solvent B (hydroxyl:anhydride equivalent ratio = 3.3) added prior to esterification.
**Still liquid after 3 months at 50° C.
Comparative Example From the data in Table I, it can be concluded that:
Stable aqueous dispersions can be made from epoxy polymers by first reducing oxirane content by around 90% or more by reaction with a monocarboxylic acid (capping) and then grafting (esterification in the Primary Reaction) with 1:1 styrene/maleic anhydride copolymer in the presence of controlled amounts of water (Examples 8, 10, 11, 12, 13 and 14).

The esterification reaction (Primary Reaction) rate is greater when primary hydroxyl groups (provided by DMPA) are present on the epoxy resin (Examples 8, 10, 11, 14 vs 12, 13). However, it is possible to esterify an epoxy polymer that contains only secondary hyroxyls (initially present in the epoxy polymer) by raising the esterification (Primary Reaction) temperature (Examples 12 and 13).

At least a 5-fold excess in the amount of water necessary for complete hydrolysis of the anhydride groups can be tolerated while still achieving water-dispersibility (Example 10).

The product of Comparative Example I was not stable in water because it had a high residual level of unreacted diepoxides.

| Example | pH | Viscosity, cp | % Solids |
|---|---|---|---|
| 8 | 9.1 | 1,020 | 30.7 |
| 9 | 9.1 | 160 | 28.3 |
| 10 | 7.6 | 516 | 31.6 |
| 11 | 9.6 | 845 | 27.1 |
| 12 | 9.6 | 1,050 | 21.7 |
| 13 | 8.9 | 870 | 32.7 |
| 14 | 9.2 | 9,800 | 20.8 |
| Epoxy-1 | 7.5 | 200 | 22.0 |

FILM PROPERTIES

Properties of clear films (on aluminum panels) made from various compositions of this invention cured with 10 and 20 phr "Cymel 370" (a melamine formaldehyde resin) are summarized in Table II. The films were formed as follows: the films were drawn down with a wire wound rod on aluminum panels and heated at 300° F. to produce dry films of about 5 mg per sq. in. Overall, properties obtained with the aqueous dispersions containing compositions of this invention are as good or better than the properties obtained with a commercial waterborne (WB) epoxy coating resin (Epoxy-1).

TABLE II

| Sample | Cure, min @ 300° F. | Thickness mg/in2 | Scotch Tape Adhesion[4] | Gardner Reverse Impact in-lbs (Pass/Fail)[5] | Boiling water 10 min[1] | Conc HCl 1 hr.[7] | Conc NH4OH 1 hr.[7] | MEK double rubs[6] |
|---|---|---|---|---|---|---|---|---|
| Epoxy-1 | 5 | 4.3 | No loss | —/8 | 2 | Good | Poor | 5 |
| | 30 | 4.4 | " | 12/24 | 9 | " | Good | 115 |
| Example 8[3] 10 phr "Cymel 370" | 5 | 4.8 | " | 24/36 | 1 | " | " | 30 |
| | 30 | 5.3 | " | 12/24 | 10 | " | " | 300+ |
| Example 8[3] 20 phr "Cymel 370" | 5 | 4.6 | " | —/16 | 6 | " | " | " |
| | 30 | 5.4 | " | 24/28 | 9 | " | " | 300+ |
| Example 13[3] 10 phr "Cymel 370" | 5 | 5.5 | " | /16 | 3 | " | " | 30 |
| | 30 | 5.5 | " | 24/28 | 9 | " | " | 300+ |
| Example 13[3] 20 phr "Cymel 370" | 5 | 5.6 | " | —/12 | 5 | " | " | 89 |
| | 30 | 5.4 | " | 16/24 | 9 | " | " | 300+ |
| Example 12[3] 10 phr "Cymel 370" | 5 | 4.5 | " | 28/36 | 2 | " | " | 34 |
| | 30 | 4.8 | " | 28/36 | 10[2] | " | " | 300+ |
| Example 12[3] | 5 | 5.3 | " | 24/28 | 2 | " | " | 133 |

TABLE II-continued

| Sample | Cure, min @ 300° F. | Thickness mg/in2 | Scotch Tape Adhesion[4] | Gardner Reverse Impact in-lbs (Pass/Fail)[5] | Immersion Resistance Tests | | | MEK double rubs[6] |
|---|---|---|---|---|---|---|---|---|
| | | | | | Boiling water 10 min[1] | Conc HCl 1 hr.[7] | Conc NH4OH 1 hr.[7] | |
| 20 phr "Cymel 370" | 30 | 4.8 | " | 16/24 | 10[2] | " | " | 300+ |

[1] Described in Table VII below
[2] changed to 6 on aging at room temperature overnight
[3] The curable mixture tested in each run contained a composition of this invention produced in the indicated Example and the indicated amount of "Cymel 370" crosslinker.
[4] ASTM D3359-78
[5] ASTM D2794-69 (reapproved 1974)
[6] Described in Table VIII below
[7] 0.5 cc of conc. HCl or conc. NH4OH placed on coated aluminum panel, covered with a watch glass and allowed to stand for 1 hour. Panel washed and examined. "Good" means no attack on film. "Poor" means slight attack on film.

EXAMPLE 15

The phenoxy resin used in this Example (Reactant A-VII) was a copolymer of bisphenol A and epichlorohydrin, having the formula:

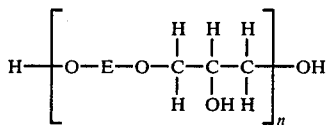

where n is an integer having values of 80–90 and E is the residue of bisphenol A. This resin had a number average molecular weight of about 25,000, and a solution viscosity of 4000 cps. (measured as a 40% solution by weight in methyl ethyl ketone at 23° C.). This resin is substantially free of terminal epxoy groups. To a 500 cc reactor fitted with reflux condenser, thermometer, agitator, and heating mantle were charged 100 g (0.35 hydroxyl equivalents) of the phenoxy resin, 40 g (0.17 anhydride equivalents) of Reactant B-I, 6 g (0.33 equivalent) water, and 300 g of cyclohexanone. The materials were stirred and heated and after a clear solution was obtained, 0.21 g benzyldimethylamine was added. Temperature was controlled at 119°–122° C. After 75 minutes, a small sample was found to disperse in a solution of water/Solvent B/dimethylethanolamine (DMEA) (5/1/0.28 ratio by wt.). After 100 minutes, 25 g water was added to increase hydrolysis of the anhydride and slow down the esterification of the phenoxy resin and to produce a varnish. An aqueous dispersion was prepared by stirring 200 g of the above varnish into 200 g of water/Solvent B/DMEA (5/1/0.28 weight ratio) and adding an additional 50 g water. The dispersion had a pH of 8.5 and a viscosity of 1600 cP (Brookfield RVT, #5 spindle, 100 rpm). Analysis by means of aqueous and alcoholic base titration showed that approximately 0.3 anhydride groups per Reactant B-I molecule had been esterified. This corresponded to esterification of approximately 1.7 hyroxyl groups per phenoxy polymer molecule.

EXAMPLE 16

Feedstock Options

Reactant A can be charged to the reactor in any suitable form (e.g., either in pellet form or as a "varnish" (solution) in a suitable solvent such as acetone). When added as a solid, the Reactant A should be dissolved before the Primary Reaction occurs. In the case of vinyl chloride polymers, such varnishes can be stabilized (e.g., with propylene oxide or a liquid epoxide).

Solvent Options

Aqueous dispersions of this invention can be prepared in several ways. One example is the "Solvent Exchange" method described in Example 1. Alternatively, the block copolymer composition solution in acetone or THF can be stirred directly into basic water and the resulting aqueous dispersion can optionally: 1. be used as is, or 2. post-stripped to remove some or all of the organic solvent. The stripped product may optionally be modified with a high boiling solvent to promote film coalescence.

There is wide latitude in the choice of organic solvents and the mode of incorporation of the block copolymer compositions of this invention into water to produce aqueous dispersions. Examples of some typical options are given in Tables III, IV, and V below for the case where Reactant A used to produce the composition is a vinyl chloride polymer such as Reactant A-I. In comparing Solvent Exchange vs no Solvent Exchange, the latter option has the advantage of lower stripping temperature if stripping is done at atmospheric pressure.

Options 2 and 3 (Tables IV and V) leave about 28% volatile organics (solvents and amine) in the final aqueous dispersion at 30% solids.

Option 3 (Table V) has several advantages: The block copolymer composition may optionally be recovered in solid form from the acetone solvent either by melt stripping or by casting a film on release paper. Furthermore, the varnish dries to form a tack-free film very quickly.

The volatile organic (solvent and amine) content of Option 3 (Table V) can be further reduced, if needed, by post-stripping the acetone from the aqueous dispersion under vacuum. The acetone that is stripped out is replaced by water. The post-stripped dispersion has a calculated water/volatile organic weight ratio of 84/16. The volatile organics consists of 76% Solvent B and 24% amines. The very low solvent content of this system provides many degrees of freedom in back-adding the preferred solvent mix for a specific end use. Once a particular solvent recipe is defined, the process solvent-exchange step can be tailored to produce the optimum dispersion for the intended end use.

TABLE III

OPTION 1
STEPWISE PARTIAL SOLVENT EXCHANGE
NO SOLVENT IN LETDOWN

| | Grams | Percent Solids |
|---|---|---|
| Reaction Mixture | | |
| Reactant A-I | 300.0 | |
| Reactant B-I | 60.0 | |
| Acetone | 385.6 | |
| Water | 16.4 | |

TABLE III-continued
OPTION 1
STEPWISE PARTIAL SOLVENT EXCHANGE NO SOLVENT IN LETDOWN

| | | | |
|---|---|---|---|
| TEA | 4.5 | | |
| | | 47.0 | |
| Solvent Exchange | | | |
| Strip Acetone | (200.0) | | |
| Add Solvent A | 129.0 | | |
| Strip Acetone | (129.0) | | |
| | | 63.5 | |
| Let Down | | | |
| Water | 605.5 | | |
| DMEA | 28.0 | | |
| | 1200.0 | 30.0 | |
| Composition of Final Dispersion | | | |
| Block Copolymer | | | |
| Composition | 30% | | |
| Volatiles | 70% | Water | 72.1% |
| | 100 | Organics | 27.9% |
| | | | 100 |
| | | Acetone | 31.1% |
| | | Solvent A | 55.0% |
| | | Amines | 13.9% |
| | | | 100 |

% volatile organics = 19.5 (solvents of amines)

TABLE IV
OPTION 2
STEPWISE PARTIAL SOLVENT EXCHANGE, SOLVENT B AT 20 PHR IN LETDOWN WATER

| | Grams | Percent Solids | |
|---|---|---|---|
| Reaction Mixture | | | |
| Reactant A-I | 300.0 | | |
| Reactant B-I | 60.0 | | |
| Acetone | 385.6 | | |
| Water | 16.4 | | |
| TEA | 4.5 | | |
| | | 47.0 | |
| Solvent Exchange | | | |
| Strip Acetone | (200.0) | | |
| Add Solvent B | 129.0 | | |
| Strip Acetone | (129.0) | | |
| | | 63.5 | |
| Let Down | | | |
| Water | 504.5 | | |
| Solvent B | 101.0 | | |
| DMEA | 28.0 | | |
| | 1200.0 | 30.0 | |
| Composition of Final Dispersion | | | |
| Block Copolymer | | | |
| Composition | 30% | | |
| Volatiles | 70% | Water | 60% |
| | 100 | Organics | 40% |
| | | | 100 |
| | | Acetone | 21.7% |
| | | Solvent B | 68.6% |
| | | Amines | 9.7% |
| | | | 100 |

% volatile organics = 28

TABLE V
OPTION 3
NO SOLVENT EXCHANGE, SOLVENT B AT 20 PHR IN LETDOWN WATER

| | Grams | Percent Solids |
|---|---|---|
| Reaction Mixture | | |
| Reactant A-I | 300.0 | |
| Reactant B-I | 60.0 | |
| Acetone | 385.6 | |
| Water | 16.4 | |
| TEA | 4.5 | |

TABLE V-continued
OPTION 3
NO SOLVENT EXCHANGE, SOLVENT B AT 20 PHR IN LETDOWN WATER

| | | | |
|---|---|---|---|
| | | 47.0 | |
| Strip | | | |
| Strip Acetone | (200.0) | | |
| | | 63.5 | |
| Let Down | | | |
| Water | 504.5 | | |
| Solvent B | 101.0 | | |
| DMEA | 28.0 | | |
| | 1200.0 | 30.0 | |
| Composition of Final Dispersion | | | |
| Block Copolymer | | | |
| Composition | 30% | | |
| Volatiles | 70% | Water | 60% |
| | 100 | Organics | 40% |
| | | | 100 |
| | | Acetone | 60.2% |
| | | Solvent B | 30.1% |
| | | Amines | 9.7% |
| | | | 100 |

% volatile organics = 28

EXAMPLE 17

Reactant B-I/Reactant A-I Ratio

About 20 parts per hundred (phr) of Reactant B-I (based on Reactant A-I) is the preferred amount for waterborne coatings. This composition is rich enough in Reactant I to retain the desirable properties inherent in the vinyl chloride polymer. There is also enough Reactant B-I present to impart excellent freeze-thaw resistance. In addition, systems containing 20 phr Reactant B-I can be successfully prepared with a wide range of Quenchant to anhydride ratios.

Successful dispersions have been prepared with weight ratios in the range of 1:10 to about 1:1 of Reactant A-1 to Reactant B-1. At ratios below about 1:10 the aqueous products have marginal freeze-thaw stability and reduced shelf-life. At ratios below about 1:20 the products are poorly dispersible in aqueous base.

With the proper control of water in the reaction system, it is possible to prepare compositions of this invention from Reactant B-I and Reactant A-I mixtures containing up to nearly 100% Reactant B-I. The effect of Reactant B-I concentration is summarized as follows:

TABLE VA

| Reactant B-I/ Reactant A-I Wt Ratio | Dispersibility in Aqueous Base[1] | Shelf Stability @ 50° C.[2] | Freeze-Thaw Stability[3] | Clarity of Air-Dried Films[4] |
|---|---|---|---|---|
| 1:100 | poor | — | — | — |
| 5:100 | good | poor | poor | clear |
| 10:100 | good | good | poor | clear |
| 20:100 | good | good | good | clear |
| 40:100 | good | good | good | clear |
| 100:100 | good | good | good | hazy |

[1]Test Method: as described in Example 1
[2]Test Method: visual examination for evidence of seedy particles, gellation or separation after seven days at 50° F.
[3]Test Method: no apparent coagulation after 24 hours at 6° F. followed by warming to room temperature
[4]Test Method: visual examination for degree of haze in a one-mil thick dry film cast on glass

EXAMPLE 18

Laboratory Scale-Up

Several compositions of this invention made from Reactant B-I and Reactant A-I were successfully scaled up to a 5-gallon reactor. The equipment used was a 5-gallon stainless steel still equipped with U-shaped agitator and a copper condenser. The still had a bottom discharge capability.

The recipe for a typical scale-up is shown in Table VI. The Reactant A-I solution was weighed into a 5-gallon can. Dry Reactant B-I and TEA catalyst were blended into the solution on a Cowles mixer. The resulting Reactant A-I/Reactant B-I/catalyst solution was transferred to the still and held under total reflux conditions for about 30 minutes. Occasional "bumping" of the still with nitrogen through the bottom port was done to clear out the pool of stagnant material in the discharge port. The acetone was stripped in an additional 25 minutes to a target solids content of 63.5% in the varnish. The lower port of the still was then opened and the hot varnish was discharged ("let down") directly into a 5-gallon pail containing the water/Solvent B/DMEA mixture on a platform scale. (Only 75% of the still contents could be discharged this way. The water letdown mixture shown in Table VI was proportionately scaled down. Optionally, a proportionate amount of the let-down mixture can be added to the varnish remaining in the still. The result is a clean still and virtual 100% recovery of product solids.)

TABLE VI

| PROCEDURE FOR SCALE-UP TO 5-GALLON STILL | |
|---|---|
| Component | Grams |
| I. Reflux | |
| Solution of Reactant A-1 | |
| Reactant A-1 | 5100 |
| Acetone | 6462 |
| Water | 382 |
| Reactant B-1 | 1020 |
| Triethylamine | 76.5 |
| II. Strip | |
| Acetone | (3403) |
| III. Let Down | |
| Water | 8584 |
| Solvent B | 1718 |
| Dimethylethanolamine | 476 |

The resulting two-phase mixture from the let down step (with the viscous varnish as the lower layer) was mixed with a Cowles mixer to a homogeneous aqueous dispersion. (Initially the varnish tends to run up the stirrer shaft causing a splashing hazard. Low RPM is required until the system is partly homogenized). The run yielded about 4 gallons of good quality dispersion. Turnaround time for this Example is about four hours.

EXAMPLE 19

Cured Coating Properties

The compositions of this invention made from hydroxy-containing vinyl chloride polymers, in common with vinyl chloride polymers generally, have good balance of chemical resistance, flexibility, and hardness. Cured coating properties of the aqueous dispersion produced as described in Example 18 above were in the same range as those of Reactant A-I dissolved in an organic solvent and similarly formulated with crosslinking additives.

Properties of clear films of the product of Example 18 cured with 10 to 20 phr Cymel 370 are summarized in Tables VII, VIII, IX. Coatings applied from the dispersion produced as described in Example 18 above were compared with two prior art commercial waterborne epoxy can coatings (Epoxy-2 and Epoxy-3). Solvent-borne versions of the reacted varnish produced as described in Example 18 above were compared with a physical blend of Reactant A-I and Reactant B-I and with Reactant A-I alone.

TABLE VII

| BOILING WATER BLUSH PROPERTIES OF CURED COATINGS# | | | | | | |
|---|---|---|---|---|---|---|
| | Applied from MIBK Solutions | | | | | |
| | | Reactant A-I/ Reactant B-I | | Applied from Water Dispersions | | |
| Bake Cycle Min/°F. | Reactant A-1 | Physical Blend | Composition of Example 18*** | Composition of Example 18## | Epoxy-2 | Epoxy-3 |
| 2/385 | Coating** Lifting | 8* | 9* | 2* | 6** | 1 | 5 |
| 3/385 | " | | | 7* | 10** | 10 | 10 |
| 5/300 | " | 7* | 7* | 2* | 4** | 2 | 0 |
| 15/300 | " | 7* | 9* | 7* | 8** | 2 | 10 |
| 30/300 | " | 7* | 9* | 7* | 8** | 5 | 10 |

Ten minutes immersion in boiling water. Ratings: 10 = no change, 8–9 faint whitening, lower ratings indicate increasingly severe whitening or blushing.
Run at two "Cymel 370" concentration as shown.
*10 phr "Cymel 370".
**20 phr "Cymel 370".
***Refers to reaction product of Example 18 before dilution with water. This reaction product was diluted further with MIBK.

TABLE VIII

SOLVENT RESISTANCE PROPERTIES OF CURED COATINGS#

| | | Applied from MIBK Solutions | | Applied from Water Dispersions | | |
|---|---|---|---|---|---|---|
| Bake Cycle Min/°F. | Reactant A-I | Reactant A-I/Reactant B-I Physical Blend | Composition of Example 18*** | Composition of Example 18 | Epoxy-2 | Epoxy-3 |
| 2/385 | 100+ | 100+ | 100+ | 100+ | 8 | 6 |
| 5/300 | 100+ | 100+ | 100+ | 100+ | 80 | 30 |
| 15/300 | 100+ | 100+ | 100+ | 100+ | 36 | 20 |
| 30/300 | 100+ | 100+ | 100+ | 100+ | 7 | 5 |

All vinyl chloride polymer systems (but not Epoxy-2 and Epoxy-3 systems) were cured with 10 phr Cymel 370.

Solvent Resistance Test ("MEK Double Rubs" Test): A piece of cheesecloth is wadded into a ball of about ½" diameter. It is soaked in MEK solvent to saturation. The cheesecloth is held so as to apply a light to moderate pressure. The panel is rubbed back and forth (one cycle) and continued until either:
(1) the coating is worn through to the surface and the number of rub cycles is reported; or
(2) If no effect is evident at 100 cycles, the result is reported as 100+. The other test conditions and ratings are described in Tables VII and IX.

***Refers to reaction product of Example 18 before dilution with water. This reaction product was diluted further with MIBK.

TABLE IX

IMPACT RESISTANCE PROPERTIES OF CURED COATINGS#

| | | Applied from MIBK Solutions | | Applied from Water Dispersions | | |
|---|---|---|---|---|---|---|
| Bake Cycle Min/°F. | Reactant A-I | Reactant A-I/Reactant B-I Physical Blend | Composition of Example 18*** | Composition of Example 18## | Epoxy-2 | Epoxy-3 |
| 2/385 | 20* | 20* | 20* | 12* | 4 | 12 |
| 3/385 | | | | 20* (8**) | 32 | 28 |
| 5/300 | 20* | 24* | 20* | 4* | 4 | 8 |
| 15/300 | 20* | 24* | 12* | 16* | 16 | 8 |
| 30/300 | 20* | 4* | — | 16* | 32 | 32 |
| Coating Weight, mg/in² | 4.8 | 5.4 | 5.2 | 5.4 | 4.2 | 4.2 |

Tests on 28 mil aluminum panels. Impact increased in 4 inch-pound increments to failure. Highest passing value shown. Values are in inch-pounds. The procedure of ASTM D2794 was used.
*10 phr "Cymel 370".
**20 phr "Cymel 370".
***Refers to reaction product of Example 18 before dilution with water. This reaction product was diluted further with MIBK.

Blush resistance in boiling water is very sensitive to the presence of chloride salts and to the state of cure in the film. In this property, the coatings produced from the composition of Example 18 performed better than coatings produced from solvent-borne Reactant A-I and in the same range as the coatings produced from commercially available waterborne epoxy can coatings (Epoxy-2 and Epoxy-3). Since impact properties are also dependent on the state of cure, both properties need to be considered together in specifying a crosslinker concentration and cure cycle.

Solvent resistance of both the waterborne and solvent-borne vinyl chloride polymer were superior to those of the commercial waterborne epoxy can coatings.

Color and gloss of the formulated coatings produced from the composition of Example 18 were excellent. Overbake discoloration was no worse than that of solvent-borne Reactant A-I. Bake cycles of 3 minutes at 385° F. or 30 minutes at 300° F. were tolerated with no added thermal stabilizer. The 3 minutes at 385° F. bake was borderline; discoloration was beginning to show in thick areas of the film. At can coating weights (4 to 6 mg of dry coating per square inch of coated surface) color stability during baking was excellent.

EXAMPLE 20

Film Properties of Aged Compositions of this Invention

Film properties were not significantly affected by aging of the compositions of this invention produced as described in Example 1 in the form of organic solutions (varnishes) or in the form of aqueous dispersions of salts of the compositions. The results of one experiment supporting this are tabulated as follows:

| FILM PROPERTIES: INITIAL/AGED* | | | |
|---|---|---|---|
| Bake min/°F. | Blush | MEK Rubs | Rev. Impact |
| 10 phr Cymel 370 | | | |
| 2/385 | 8/9 | 100+/100+ | 26/16 |
| 3/385 | 8/8 | " | 20/20 |
| 15/300 | 8/8 | " | 20/16 |
| 30/300 | 9/8 | " | 20/16 |
| 20 phr Cymel 370 | | | |
| 3/385 | 8/8 | " | 16/20 |
| 3/385 | 9/9 | " | 8/8 |
| 15/300 | 7/8 | " | 8/12 |
| 30/300 | 8/9 | " | 8/8 |

*Initial: "Varnish" of Example 1 was aged 15 weeks. Aqueous base and Cymel added just prior to testing.

Aged: Aqueous dispersion of Example 1 was aged 15 weeks at room temperature. Cymel added just prior to testing.

The other test conditions and ratings are as described in Tables VII to IX above.

| Example 21 | |
|---|---|
| Components: | Amounts (grams) |
| Solution of Reactant A-I: | |
| Reactant A-1 | 300 |
| Acetone | 300 |
| Reactant B-III* | 60 |
| Water | 4.0 |
| Catalyst solution | |
| Triethylamine | 4.5 |
| Acetone | 4.5 |
| Solvent B | 129 |

*A styrene-maleic anhydride copolymer (mole ratio 2:1) having an $M_n$ of 1700 and commercially available as "SMA 2000".

Procedure:

Charge acetone and Reactant A-1 to reaction vessel and dissolve. Add Reactant B-III and dissolve. Bring to reflux temperature (about 60° C.). Add water and mix. Add catalyst solution and mix. Hold at reflux until a drop of reaction mixture disperses in test solution of DMEA/Solvent B/water (5/9/86 weight percent). The reaction mixture was dispersible in the test solution after 55 minutes at reflux from the time the catalyst solution was added.

Then 129 grams of Solvent B were added and 220 grams of solvent (mostly acetone) were removed by distillation. The resultant product was a viscous varnish that had a 66.0% by weight solids content. The viscous varnish was diluted with the above test solution to form a translucent uniform aqueous dispersion of 21.4% solids with a viscosity of about 200 cP.

EXAMPLE 22

| Example 22 | |
|---|---|
| Components: | Amounts (grams) |
| Solution of Reactant A-I: | |
| Reactant A-I | 300 |
| Acetone | 300 |
| Reactant B-IV* | 60 |
| Water | 5.8 |
| Catalyst solution: | |
| Triethylamine | 4.5 |
| Acetone | 4.5 |
| Solvent A | 129 |

*Partial ester of Reactant B-I (35 to 50% esterified) and commercially available as "SMA 17352").

Procedure:

Charge acetone and Reactant A-I to reaction vessel and dissolve. Add Reactant B-IV and dissolve. Bring to reflux temperature (about 60° C.). Add water and mix. Add catalyst solution and mix. Hold at reflux until a drop of reaction mixture disperses in the test solution of DMEA/Solvent B/water (5/9/86 weight percent). The reaction mixture was dispersible in the test solution after sixty-four minutes at reflux from the time the catalyst solution was added.

Then, 129 grams of Solvent A were added and 216 grams of solvent (mostly acetone) was removed by distillation. The resultant product was a viscous varnish at 64.8% solids content. The viscous varnish was stirred into a solution of DMEA/Solvent B/water (5/16/79 weight percent) to form an opaque uniform aqueous dispersion of 35.2% solids content with a viscosity at 348 cP.

COMPARATIVE EXAMPLES J AND K

To a 500 cc. reaction vessel were charged 400 g. of a 50% acetone solution of Reactant A-VI, 100 g. of a 40% acetone solution of Reactant B-V (identified in Examples G & H) and 11.4 g. water. The materials were heated to reflux (57° C.) at which point 6.0 g. TEA in 6 g. acetone were added. In 10 minutes, the batch gelled.

This experiment was repeated using less Reactant B-V, i.e., 25 g. of a 40% solution. The water was omitted because hydrolysis of the Reactant B-V caused it to become insoluble. When water dispersibility was not obtained after 140 minutes at 57° C., another 25 g. of Reactant B-V solution was added. After an additional 40 minutes, the batch gelled.

This Example illustrates the inoperability of ethylene-maleic anhydride copolymers in the process of this invention.

EXAMPLE 23

This Example illustrates a water indispersible epoxy polymer (Reactant A-VIII) prepared by reacting a bisphenol-A terminated epoxy resin with Reactant B-I using Solvent B as the sole Quenchant. Using the primary alcohol, Solvent B, as the Quenchant results in half ester formation with the styrene/maleic anhydride copolymer (Reactant B-I) as well as "grafting" of Reactant B-I to the epoxy/bisphenol-A polymer by ester formation.

To a 500 cc. 3-necked glass reaction vessel fitted with stirrer, condenser, and thermocouple, were added 179.8 g. "EPON-829" (identified above under "Detailed Description of the Invention") and 120.2 g. bisphenol-A. The materials were stirred and heated at 175°-180° C. After 1¼ hours, 45 g. Solvent B were added. After four hours, an analysis for epoxy group content showed only 0.08% epoxy groups and the product cooled to 63° C. One hundred twenty grams of a 50% solution of Reactant B-I in acetone were added along with 6 g. TEA in 6 g. acetone. Heat was applied and at 91° C., distillate began to be collected. Thirty-five grams of Solvent B were added to reduce viscosity. When the batch temperature reached 111° C., distillation was changed to reflux. A total of 26 g. distillate was collected. Heating was continued under reflux conditions and samples tested every half hour for dispersibility in water/Solvent B/DMEA, (5/1/0.28 by wt.). Temperature rose to 123° C. in 3 hours and 17 minutes at which point a sample was found to be water-dispersible.

The resulting varnish was cooled to 93° C. Two hundred grams of this varnish were stirred into a preformed mixture of 159.2 grams water, 31.9 grams Solvent B, and 8.9 grams DMEA. The result was a creamy uniform aqueous dispersion with the following properties:

| | |
|---|---|
| Solids Content | 38.0% |
| pH | 9.01 |
| Viscosity, cP (Brookfield RVT, #4, 100 rpm) | 1570 |

Molar equivalents in the intial reaction were:

| Reactant A-VIII, | hydroxyl | 1.15 |

-continued

| | | |
|---|---|---|
| $M_n$ 3870 (theoretical) | | |
| Solvent B | hydroxyl | 1.65 |
| Reactant B-I | anhydride | 0.255 |
| TEA | amine | 0.059 |

Ratios of molar equivalents were:

| | |
|---|---|
| Solvent B as % of Anhydride | 647 |
| Amine as % of acidity | 12 |

The aqueous dispersion described above was formulated by adding "Cymel 370" (15 phr.). Films were cast from the resulting curable mixture on aluminum Q panels and cured 15 minutes at 350° F. Cured films has the following properties:

| | |
|---|---|
| Boiling Water blush | 9 |
| Solvent Resistance (MEK Rubs) | 100+ |
| Impact Resistance | 8 |
| Film Thickness (mg/in$^2$) | 5.3 |

The tests used are described in previous Examples.

COMPARATIVE EXAMPLE L

To a 500 cc. reaction vessel were charged 400 g. of a 50% acetone solution of Reactant A-VI, 36 g. of a 28% acetone solution of Reactant B-VI (identified below), 6 g. TEA, and 14 g. Solvent B. The materials were heated to the reflux temperature of 59° C. and tested periodically for dispersibility in water/Solvent B/DMEA (5/1/0.28). After 167 minutes, an additional 37 g. of 28% PA-18 in acetone were added. After another 68 minutes, an additional 6 g. TEA were added. After 11 hours at 59° C., the batch gelled without reaching a water dispersible state.

Reactant B-VI is a solid linear polyanhydride polymer derived from octadecene-1 and maleic anhydride. The comonomers used to make Reactant B-VI are in a 1:1 molar ratio. The $M_n$ of Reactant B-VI is about 50,000. Reactant B-VI is commercially available as "PA-18".

This Example illustrates the inoperability of Reactant B having too high a molecular weight.

EXAMPLE 24

To a 500 cc. 3-necked glass reaction vessel fitted with stirrer, reflux condenser, and thermocouple were added 200 g. of Reactant A-VI, 160 g. of Solvent B, and 40 g. of acetone. The materials were stirred and heated for one hour to 80° C. at which point the Reactant A-VI was dissolved and 40 g. of Reactant B-I were added. Stirring at 80° C. was continued for another ½ hour to dissolve the Reactant B-I, at which point 6.0 g. TEA in 6 g. acetone were added. After 40 additional minutes, a test sample was found to be dispersible in basic water. Twenty-five grams of water were added and heating continued at reflux for another 156 minutes.

Two hundred grams of the above varnish were added to 200 g. water/Solvent B/DMEA, 5/1/0.28 by wt., and 250 g. of water. After two weeks at 50° C., a sample was still fluid. After two weeks at room temperature, some sediment was observed.

EXAMPLE 25

This Example illustrates the use of the Dispersibility Test on various compositions of this invention and various reactants.

Twenty-five parts by weight of Reactant R-I were dissolved in 50 parts of acetone. This solution was then diluted with a mixture of 345 parts by weight water and 80 parts by weight of Solvent B. The resultant solution contained approximately 5 percent by Reactant A-I by weight. Reactant A-1 formed a large mass of viscous sludge when the organic solvent solution was mixed with the water/Solvent B mixture. All of the sludge was retained on a 325 mesh screen. Hence Reactant A-I was water-indispersible. Similar results were obtained with Reactant A-II.

The following reactants were tested as described above, with the indicated amount of base use to neutralize the carboxy groups:
Reactant B-I: 0.76 gm DMEA/gm of Reactant B-I
Reactant B-II: 0.55 gm DMEA/gm of Reactant B-II
Reactant B-III: 0.43 gm DMEA/gm of Reactant B-III Each of these three reactants formed clear solutions that were free of any solid matter. No solids were retained when these solutions were passed through a 325 mesh screen. Hence these reactants were all water-dispersible.

Five compositions of this invention produced in the indicated examples were tested using the above procedure, with the indicated amount of base (DMEA) used to neutralize 100% of the carboxy groups to produce aqueous dispersions.

| | | Dispersion Properties | |
|---|---|---|---|
| Composition of Example | Amount of DMEA | Average Particle Size (microns) | Percent Solids by Weight Retained on 325 Mesh Screen |
| 1 | 0.13 gm/gm of solids | 0.26 | none |
| 11 | 0.13 gm/gm of solids | 0.10 | none |
| 17 @ 10 phr Reactant B-I* | 0.07 gm/gm of solids | 1.90 | none |
| 17 @ 40 phr Reactant B-I* | 0.22 gm/gm of solids | 0.10 | none |
| 21 | 0.09 gm/gm of solids | 0.22 | none |

*Based on Reactant A-I.
Particle size measurements made using a Coulter Sub-Micron Particle Size Analyzer, Model N-4. All of the compositions were water-dispersible as indicated by the particle size and absence of retained solids.

EXAMPLES 26, 27, AND 28

Three aqueous dispersions of this invention were made as follows:

| | Reaction Mixture | | |
|---|---|---|---|
| | Amount (Grams) | | |
| Component | Example 26 | Example 27 | Example 28 |
| Reactant A-II | 75 | 75 | 75 |
| Reactant B-I | 15 | 7.5 | 3.8 |
| Dry Acetone | 195 | 187.5 | 183.8 |
| TEA | 2.0 | 2.0 | 2.0 |

The two reactants were charged to a reactor as a solution in the acetone, the solution was brought to reflux temperature (about 60° C.) and the TEA was added. The reaction mixture so formed was heated about 30 minutes to generate a varnish containing a composition having about 1.2 ester groups per Reactant B-I molecule. The following equivalent amounts of water and anhydride groups were used in producing the varnish

|  | Example 26 | Example 27 | Example 28 |
|---|---|---|---|
| Final Total solids Content | 25.6% | 22.7% | 37.8% |
| Equivalents of Water | 0.5 | 0.5 | 0.5 |
| Equivalents of Anhydride | 0.0625 | 0.03125 | 0.015625 |
| Ratio of Equivalents H$_2$O/Anhydride | 8 | 16 | 32 |

Then 9 grams of water was added to each reaction mixture and the mixtures were allowed to react further for 1 hour at 30°–40° C. to produce a varnish.

Then a solution comprised of:

Solvent B: 57.4
DMEA: 8.1
Water: 221.

was added to each varnish (slowly at first, with stirring, and then more rapidly) to produce aqueous dispersions containing the organic solvents. Essentially all of the acetone and some water was removed from the dispersions by vacuum distillation (temperature of about 43° C. at 25 inches of Hg) to produce stripped aqueous dispersions.

Films cast from the stripped aqueous dispersions (5 wet mils on glass) dried clear and grit-free.

PREFERRED PROCEDURE FOR USE OF HYDROPHOBIC VINYL POLYMERS AS REACTANT A

As is illustrated in Examples A, C, D, E and F above, compositions produced from hydrophobic hydroxyl-containing vinyl resins with number average molecular weights above about 6,000 (such as in Reactant II and Reactant III) could not be dispersed in water when made by the Initial Addition Method. Apparently, the combination of higher molecular weight and lower hydroxy content (2% OH in Reactant II vs. 2.9% OH in Reactant I) is partly responsible for this behavior. Another important factor may involve the higher vinyl chloride level (80% in Reactants A-II and A-III vs. 69% in Reactant I). To further understand the effect of the compositional factors involved, polyvinyl polyols were coupled together with small amounts of toluene diisocyanate, thus keeping intact the hydrophilic nature of the polyols but increasing their molecular weight. The results of this technique must be interpreted cautiously since highly branched polymers may be formed. However, at the low levels of coupling involved (about 10% of the hydroxyl groups were reacted), such effects are probably small. The data obtained is summarized in Table X below. The data does indicate that compositions made from certain polyvinyl polyols and Reactant B-I could be dispersed quite well despite molecular weights of 9,000 to 12,000. A sample of alcoholyzed Reactant XI (identified in Example 33 below), which was prepared with a comparable hydroxyl content and molecular weight, could not be dispersed after reacting with Reactant B-I. The effect of other composition variables, including the amount of ester groups, the type and ratio of reactant B-I used or the amine neutralant are discussed below.

TABLE X

| REACTANT A | WEIGHT % HYDROXY PROPYL ACRYLATE | WEIGHT % HYDROXYL | APPROXIMATE NUMBER AVERAGE MOLECULAR WEIGHT | DISPERSIBILITY[1] |
|---|---|---|---|---|
| TDI/A-XII[2] | 35 | 4.6 | 4,000 | Yes |
| Reactant A-I | 23 | 3.0 | 6,000 | No |
|  |  |  | 7,000 | No |
| Reactant A-XIII[3] | 35 | 4.6 | 9,000 | No |
|  |  |  | 6,000 | Yes |
| Reactant A-XIV[4] |  |  | 9–12,000 | Yes |
| Alcoholyzed Reactant A-XI | — | 5.9 | 11,000 | No |

[1]Dispersibility Test
[2]The reaction product of Reactant A-XII and tolylene diisocyanate. Reactant A-XII contains about 62 wt. % polymerized vinyl chloride, about 4 wt. % polymerized vinyl acetate and about 34 wt. % polymerized hydroxypropyl acrylate. About 10% of the OH of Reactant A-XII was reacted with the diisocyanate.
[3]A copolymer containing 35 weight % polymerized vinyl chloride and 65 weight % polymerized hydroxy propyl acrylate.
[4]Reaction product of Reactant A-XIII and tolylene diisocyanate about 10% of the OH of Reactant A-XIII was reacted with the diisocyanate.

Although molecular composition is important in determining the dispersibility of compositions made from vinyl polymers, physical factors are equally, if not more, important. While the Dispersibility Monitoring Test is adequate to confirm that an easily water-dispersible composition (such as one made from Reactant A-I and Reactant B-I) is at the correct level of esterification to pass the Dispersbility Test, it may be insufficient for other compositions. Because of this, the effect of changing the variables involved was studied. Some general conculsions resulting from this study are presented in Table XI below. In summary, it was found that dispersible compositions could be made from high molecular weight vinyl polymers by slowly adding an aqueous solution of Solvent B and amine (either dimethylethanolamine or ammonia—not critical for initial stability) to a warm solution of polymer with stirring. A preferred procedure for a small scale test involves warming 25 g of polymer solution to 50° C. followed by adding while stirring with a magnetic spin bar over 5 min. the following mixture:

20 g H$_2$O
5 g Solvent B
0.2 DMEA

TABLE XI

| Variable | Illustrated By | Satisfactory | Unsatisfactory |
|---|---|---|---|
| Order of Addition | Polymer solution added to "Aqueous"[a] | x | x |

TABLE XI-continued

| Variable | Illustrated By | Satisfactory | Unsatisfactory |
|---|---|---|---|
| Rate of Addition | Aqueous added to polymer Aqueous added to polymer solution | "Slow" | "Fast" |
| Temperature | Aqueous added to polymer solution | Ca. 50° C. | Room temp. (large particles, gritty) |
| Concentration | Aqueous added to graft solution | 30% | 40% (tends to be gritty) |
| Agitation Level | | A certain minimum is necessary depending on other factors. | |
| Water Solubility of Solvent | Aqueous added to solutions of polymer in acetone, MEK, and cyclohexanone | MEK with limited water solubility leads to slower particle formation and greater ease of preparation. Acetone can lead to rapid precipitation and grit. | Cyclohexanone being water insoluble gives a water-in-oil dispersion. |
| Type of Cosolvent | Type of solvent (such as Solvent B or Solvent C in Aqueous let down | Effects particle size and partial solubility of graft polymer in the cosolvent. | |

$^a$Aqueous = Water/Solvent B/DMEA.

During this preferred procedure, the viscosity of the reaction mixture will rise to a maximum and then fall. The changes which occur in the formation of the emulsion appear to be taking place in three stages. In the beginning, as the aqueous medium is slowly added to the hot polymer solution, it dilutes the acetone solvent and eventually dissolves any insoluble amine/carboxylate salt present. In the second stage, the solution becomes opaque and viscosity builds as the polymer phase begins to separate. Then, in the last stage, a sudden drop in viscosity takes place as the water swollen polymer particle-acetone mixture becomes an oil-in-water dispersion. Variations in this preferred procedure were used in producing the compositions described below.

EFFECT OF COMPOSITION VARIABLES

The specific physical requirements need to produce a stable dispersion from any particular combination of Reactant A and Reactant B will vary depending on the chemistry of the combination. Among the factors which need to be considered here are:

(a) Molecular weight of Reactant A.
(b) Hydrophile/hydrophobe balance (e.g., % OH, and halogen level).
(c) Level of esterification.
(d) Level and placement of COO$^-$ (amount and type of Reactant B and quench conditions).
(e) Type of amine used.

Five different vinyl polymers shown in Table XII ranging in hydroxyl content from 1.1 to 5.3 wt. % and in number average molecular weight from 8,500 to 23,000 were examined. Aqueous dispersions could be made with the preferred procedure using all the reactant combinations, although they differed in stability.

Excellent dispersions can be made from combinations of Reactant B-I and Reactants A-V, X or XI. While compositions made from Reactant B-I and Reactant III or IX can be put into dispersion form from acetone, they are less stable and settle in time.

TABLE XII

| | REACTANT | | | | |
|---|---|---|---|---|---|
| | A-II | A-XI | A-III | A-IX | A-X |
| Mn | 8,500 | 12,000 | 15,500 | 23,100 | 23,000 |
| % OH | 2 | 1.1 | 2.3 | 2.3 | 5.3 |
| % VCl$^1$ | 80 | 58 | 91 | 91 | 80 |
| % VOAc$^2$ | 5 | 34 | 3 | 3 | 6 |
| % HPA$^3$ | 15 | 8 | — | — | — |
| % VOH$^4$ | — | — | 6 | 6 | 14 |

$^1$Weight percent polymerized vinyl chloride.
$^2$Weight percent polymerized vinyl acetate.
$^3$Weight percent polymerized hydroxy propyl acrylate.
$^4$Weight percent vinyl alcohol.

a. Reactant A-II/Reactant B-I Combination

The compositions containing 0.5–1.5 ester groups per Reactant B-I molecule were prepared with Reactant B-I levels of 2.5, 5, 10, and 20 phr of Reactant A-II in dry acetone at 30% solids (Table XIII below). This intermediate level of esterification was chosen since very low level products cannot be dispersed while those approaching three ester links/Reactant B-I molecule are in danger of gelling. The reaction times required to achieve the desired ester levels increased as the Reactant B-I was reduced even though the concentration of triethylamine catalyst was left constant. Good dispersions could be prepared from the 5, 10, and 20 phr Reactant B-I adducts, but efforts with 2.5 phr Reactant B-I were unsuccessful. The 5 phr product failed the freeze-thaw test.

TABLE XIII

PREPARATION OF REACTANT A-II/REACTANT B-I COMBINATIONS

| | Extent of Reaction Esters/ Reactant B Molecule | Reaction Time Temp. = 58° C. | Extent of Reaction Esters/ Reactant A-II | Reaction Solids | Amt. of H$_2$O in Reaction | Amt. of Catalyst TEA/ Reactant B | Comment - 3 g H$_2$O/100 g Polymer soln. at 30% solids is effective rx. stopper |
|---|---|---|---|---|---|---|---|
| Reactant A-II 20 phr | 1.2 | 30 min | ~1 | 30% | Dry | 13.3% | Emulsion prepared by addition of Aqueous DMEA & Solvent B cell using a magnetic bar stirrer had a viscosity of 35 cp @ 25.6% and a pH of 8.5. |
| Reactant A-I 10 phr Reactant B | 1.1 | 60 min | ~0.5 | 30% | Dry | 28% | Varied amounts of Solvent B, varied amounts and varied type |

TABLE XIII-continued

| | Extent of Reaction; Ester Groups/ Reactant B Molecule | Reaction Time (Temp. = 58° C.) | Extent of Reaction Ester Groups/ Reactant A-II Molecule | Reaction Solids | Amount of H₂O in Reaction | Amount of Catalyst TEA/ Reactant B | Comment - 3 g H₂O/100 g Polymer soln. at 30% solids is effective quenchment |
|---|---|---|---|---|---|---|---|
| Reactant A-II 5 phr Reactant B-I | 1.0 | 90 min | ~0.25 | 30% | Dry | 56% | of amine, all letdowns ok. All % < 30% as latex. Made at % = 35-47%. Fail freeze thaw - not enough Reactant B-I. |
| Reactant A-II 2.5 phr Reactant B-I | 1.5 | 120 min | ~0.125 | 30% | Dry | 112% | Not enough Reactant B-I to get stable latex. |
| Reactant A-II 10 phr Reactant B-I | Gel | 5 min | Gel | 50% | Dry | 28% | |
| Reactant A-II 10 phr Reactant B-I | Local gelling | 60 min | Local gelling | 50% | ~3% | 28% | |

PREPARATION OF REACTANT A-II/REACTANT B COMBINATION

| | Extent of Reaction; Ester Groups/ Reactant B Molecule | Reaction Time (Temp. = 58° C.) | Extent of Reaction Ester Groups/ Reactant A-II Molecule | Reaction Solids | Amount of H₂O in Reaction | Amount of Catalyst TEA/ Reactant B | Comment - 3 g H₂O/100 g Polymer soln. at 30% solids is effective quenchment |
|---|---|---|---|---|---|---|---|
| Reactant A-II 10 phr Reactant B-I | 0.7 | 60 min | ~0.5 | 45% | ~3% | 28% | |
| Reactant A-II 10 phr Reactant B-I | 0.6 | 60 min | ~0.5 | 45% | ~3% | 28% | |
| Reactant A-II 20 phr Reactant B-I | 1.3 | 75 min | ~0.25 | 45% | ~3% | 56% | |
| Reactant A-II 20 phr Reactant B-II | 0.9 | 45 min | ~1 | 30% | Dry | 14% | Made in acetone - very seedy latex. |
| Reactant A-II 20 phr Reactant B-III | 0.9 | 60 min | ~1 | 30% | Dry | 14% | Made in acetone - very seedy latex. |
| Reactant A-II 20 phr Reactant B-III | 0.8 | 45 min | ~1 | 30% | Dry | 14% | Made in MEK - good latex comparable to 10 ph Reactant B-I in properties. |

In preparation for a scale-up of some of the compositions, a number of exploratory runs were made. This work showed that at highest reasonable concentration (50% solids) in acetone, the esterification proceeded so rapidly that the polymer gelled before it could be quenched. With 3% water added at the start, the reaction was easily controlled but a gel layer formed on the bottom of the reactor due to poor heat transfer. Subsequent runs at 45% solids gave 0.7 ester group per Reactant B molecule in one hour without difficulty and this was used for the scale-up. Approximately 4 gallons of each of the 5 and 10 phr versions were prepared.

Changing the styrene-maleic anhydride ratio in Reactant B from 1:1 (Reactant B-I) to 2:1 (Reactant B-III) and finally 3:1 (Reactant B-VII) results in a pronounced decrease in stabilization when acetone is used as the solvent. A dispersion can be made using 20 phr of Reactant B-III (1.3 ester group per Reactant B molecule), but it precipitates when the acetone is stripped off. With 20 phr of Reactant B-VII in acetone, a dispersion could not be made. When we switched the solvent to MEK, a water dispersion resulted, but this became grainy when the solvent was stripped off. However, doubling the amount of cosolvent did give a good final dispersion.

The decrease in stability observed in processing from Reactant B-I to Reactant B-III to Reactant B-VII can be ascribed not only to the reduced level of carboxyl groups on the graft but due to the increased hydrophobic character of the latter molecule. Furthermore, since 20 phr Reactant B-VII displays poorer dispersibility than 10 phr Reactant B-VII (7 styrenes/14 COOH), one can infer that the additional hydrophobicity of the Reactant B-VII (12 styrene resins/7 COOH) molecule outweighs the potentially better surfactant capability resulting from a broader spacing of COO⁻ species.

b. Reactant A-XI/Reactant B-I Combination

Satisfactory dispersions were made from compositions produced from Reactant A-XI and 5, 10, and 20 phr of Reactant B-I. A large batch of the 20 phr product from which acetone had been stripped had a pH of 8.3, viscosity of 60 cP @ 27.4% Reactant B-I (see Table XIV below). Particle size (weight average obtained using spectrophometric technique) was 1029 Å.

TABLE XIV

PREPARATION OF COMPOSITIONS FROM 1 B-I AND VARIOUS REACTANTS A

| | Extent of Reaction Ester/Groups Reactant B-I Molecule | Reaction Time Temp. = 58° C. | Extent of Reaction: Ester Groups/ Reactant A Molecule | Reaction Solids % | Amount of H₂O in Reaction Mixture | Amount of Catalyst TEA/ Reactant B-I | Comment - 3 g H₂O/100 g Polymer soln. at 30% solids is effective quenchment |
|---|---|---|---|---|---|---|---|
| Reactant XI 20 phr Reactant B-I | 1.1 | 90 min | 1.5 | 30% | Dry | 0.13% | Freeze/thaw satisfactory - water spot test poor compared to 10 + 5 phr Reactant B-I versions. |
| Reactant XI 10 phr Reactant B-I | 1.4 | 60 min | ~0.8 | 30% | Dry | 0.27 | Not enough Reactant B-I for freeze-thaw stability |
| Reactant XI 5 phr Reactant B-I | 1.5 | 105 min | ~0.4 | 30 | Dry | 0.54 | Not enough Reactant B-I for freeze thaw-stability. |
| Reactant X 2.5 phr Reactant B-I | 1.2 | 60 min | ~3 | 22 | Dry | 0.13 | |
| Reactant X 10 phr Reactant B-I | 1.1 | 80 min | ~1.5 | 21 | Dry | 0.25 | No data on dispersion. |
| Reactant III | 0.9 | 90 mn | 0.9 | 22 | Dry | 0.13 | Best dispersion settled |

TABLE XIV-continued

PREPARATION OF COMPOSITIONS FROM 1 B-I AND VARIOUS REACTANTS A

| | Extent of Reaction Ester/Groups Reactant B-I Molecule | Reaction Time Temp. = 58° C. | Extent of Reaction: Ester Groups/ Reactant A Molecule | Reaction Solids % | Amount of H$_2$O in Reaction Mixture | Amount of Catalyst TEA/ Reactant B-I | Comment - 3 g H$_2$O/100 g Polymer soln. at 30% solids is effective quenchment |
|---|---|---|---|---|---|---|---|
| 20 phr Reactant B-I Reactant IX 20 phr Reactant B-I | 0.95 | 90 min | 1.0 | 22 | Dry | 0.13 | on standing. Best dispersion settled on standing. | c. Reactant A-X/Reactant B-I Composition

Despite the fact that the hydroxyl in Reactant A-X was vinyl alcohol derived, good water dispersions were made using either Solvent B or Solvent C. This is the highest molecular weight ($M_n$ 23,000) vinyl polymer into water dispersion by the process of this invention in these experiments. Both the amine (DMEA) and cosolvent appear to be needed for a grit free dispersion. On standing, these emulsions discolored turning yellow and then tan. No settling took place, however.

A large run of the 20 phr product was made and vacuum stripped to 19.4% solid and pH 9.4. Viscosity was 80 cP and particle size 1145 Å.

d. Reactant A-III/Reactant B-I and Reactant IX/- Reactant B-I

In contrast to the excellent dispersions possible with the Reactant A-X, Reactants III and IX, which also contain hydroxyl in the form of vinyl alcohol, gave less satisfactory results when made in acetone. With both of these cases, the emulsion had marginal stability and settled within a week on standing at room temperature. When the dispersion was prepared from methyl ethyl ketone, an excellent product was formed.

e. Quenching—Its Importance to Dispersibility

In many cases, a composition formed by esterifying the hydroxyl groups of a vinyl polymer with styrene-maleic anhydride is not stable, but continues to advance in molecular weight and ultimately gels. To prevent this behavior, a small portion of water can be added to "quench" the esterification reaction by hydrolyzing residual anhydride groups. The quench process can also affect the water dispersibility of the graft copolymer, although the effect varies depending on the vinyl polymer used. With the Reactant A-I/Reactant B-I, ester level stabilizes rapidly after the addition of 2% water and dispersibility and remains good. similarly, the water dispersibility of compositions made with Reactant A-II (Mn 8500, [OH]=2%/(5–20 phr Reactant B-I molecule) is not time sensitive. With the Reactant A-IX/Reactant B-I composition, however, a point appears to have been reached where quench time is important.

At 20 phr of Reactant B-I, the dispersibility behavior is comparable to Reactant A-I while at 10 and 5 phr, initial dispersibility was poor but improved dramatically after 8–12 hours time. Here, the higher molecular weight and reduced hydroxyl content (Mn 12,000 [OH]=1.1%) require additional COO$^-$ groups for emulsification.

The Examples 29 to 33 below illustrate in more detail the above-described preferred procedure for producing water dispersible compositions using hydrophobic polymers as Reactant A.

EXAMPLE 29

A procedure similar to that described in Examples 26, 27 and 28 was carried out with the following starting materials:

| | |
|---|---|
| Reactant A-III in MEK | 75 gm 180 gm |
| Reactant B-VII[1] in MEK | 15 gm 15 gm |
| TEA | 2.1 gm |
| Water | 9.0 gm |

[1]Reactant B-VII is a styrene/maleic anhydride copolymer commercially available as "SMA3000" having a number average molecular weight of 1900, and an acid number of 275 and a styrene/maleic anhydride ratio of 3 to 1 on a mole basis.

The reactants were charged to a reactor as solutions in the amounts of MEK indicated above. TEA was added and the reaction mixtures so formed were heated to reflux temperature (about 80° C.). The mixture was held at reflux until about 0.8 ester groups per Reactant B-VII molecule had formed. Water was added and the mixture was held one hour at a temperature that varied between 40°–80° C. to produce a varnish.

Then the following solution was added to 287.1 grams of the varnish with stirring:

| | |
|---|---|
| Solvent B | 72.7 |
| DMEA | 0.8 |
| Water | 141.6 |

A sample of diluted material (aqueous dispersion containing organic solvents) was cast at 5 mils wet on a glass plate. The dispersion air dried to a clear, glossy film.

The dispersion was then subjected to vacuum distillation at about 26 inches of Hg (stripped of organic solvent) until the solids content reached 35.7 weight percent.

A sample of the stripped dispersion at 35.7% total solids was cast at 5 mils wet on a glass plate. It air dried to a clear, glossy film.

EXAMPLE 30

The following reaction mixture was formed:

| | |
|---|---|
| Reactant A-III | 60 gm |
| Reactant B-I | 12 gm |
| Acetone | 212 gm |
| TEA | 1.6 gm |

The mixture was reacted to form 0.9 ester groups per Reactant B-I molecule by heating for about 45 min. at 60° (reflux). Then, the mixture was quenched with 9.0 grams of water to form a varnish. At this point the following amounts of materials had been used:

| | |
|---|---|
| Equivalent of Water | 0.5 |
| Equivalent of Anhydride | 0.05 |
| Ratio Water/Anhydride | 10 |

The varnish was let down with mixture of:

| | | |
|---|---|---|
| Solvent B | 58.9 | gm |
| DMEA | 8.2 | gm |
| H$_2$O | 235.7 | gm |

Detailed Procedure

In a 3-neck round bottom flask equipped with a stirrer, dropping funnel and reflux condenser was charged:

(1) A solution of 60 gm Reactant A-III in 300 gm acetone.

(2) A solution of 12 gm Reactant B-I in 12 gm acetone.

(3) At reflux 1.6 gm of TEA was added.

The mixture so formed was held at reflux until about 0.9 ester groups per Reactant B-I had been formed.

A 25 gm portion of warm (50° C.) varnish so produced was dispersed by adding with stirring a solution of 5 grams of Solvent B, 0.7 gms of DMEA and 20 gm of water. The water dispersion so formed was cast at 5 mils on a glass plate. It air dried to a clear film.

EXAMPLE 31

A procedure similar to that shown in Examples 26, 27 and 28 was carried out with the following formulation:

| Material | Amount (Grams) |
|---|---|
| Reactant A-IX[(1)] | 100 |
| MEK | 300 |
| Reactant B-VII | 20 |
| TEA | 6.0 |

[(1)]Reactant A-IX is terpolymer of 91 wt. % vinyl chloride, 3 wt. % vinyl acetate and 6 wt. % vinyl alcohol having a number average molecular weight of about 23,000.

The reactants were dissolved in the MEK, charged to a reaction vessel and heated to reflux about 77° C. The TEA was charged and the reaction mixture so formed was held at 77° C. for about one hour until about 1.2 ester groups per Reactant B-VII molecule had formed.

The varnish so produced was further treated as follows.

To 25 gm of the varnish was added:
5 gm of Solvent B
1 gm of DMEA
5 gm of Water

The water was added slowly with agitation. When 5 gm of water had been added, the varnish became hazy. Next, the partially diluted varnish was transferred to an ultrasonic agitation device and with the device operating at full power, 20 gm of water were added to produce an aqueous dispersion. The dispersion was cast on glass at 5 wet mils. The dispersion air dried to a clear glossy film.

EXAMPLE 32

Three aqueous dispersions of this invention (Dispersions A, B and C) were produced as follows:

Dispersion A

The following reaction mixture was formed:

| Material | Amount (Grams) |
|---|---|
| Reactant A-X[(1)] | 50 |
| Reactant B-I | 10 |
| Acetone | 210 |
| TEA | 1.3 |

[(1)]A terpolymer of 80 wt. % vinyl chloride, 6 wt % vinyl acetate and 14 wt. % vinyl alcohol having a number average molecular weight of about 23,000.

The reaction mixture was reacted to form 1.2 ester groups per Reactant B-I molecule by heating the reaction mixture for about 45 minutes at 60° C. (reflux). Then the reaction was quenched by adding 9.0 grams of water and heating at 60° C. for one hour. The amounts of materials used up to this point were equivalent to:
Equivalent of Water: 0.5
Equivalent of Anhydride: 0.042
Ratio Water/Anhydride: 11.9

Then 54.3 grams of Solvent B was added, a solution of 5.4 grams of DMEA in 217.0 grams of water was added and most of the acetone was volatilized to produce an aqueous dispersion (Dispersion A).

Dispersion B

This dispersion was produced in the same manner as Dispersion A, except that 54.3 grams of Solvent C was used in lieu of Solvent B.

Dispersion C

This dispersion was produced in the same manner as Dispersion A, except that one half the amount of DMEA was used.

EXAMPLE 33

A procedure similar to that shown in Examples 25, 26 and 27 was carried out with the following formulation:

| Material | Amount (Grams) |
|---|---|
| Reactant A-XI[(1)] in acetone | 75 200 |
| Reactant B-I in acetone | 15 15 |
| TEA | 2.0 |

[(1)]A terpolymer of 60 wt % vinyl chloride, 32 wt. % vinyl acetate and 8 wt. % of hydroxy propyl acrylate having a number average molecular weight of about 12,000.

The solutions of Reactant A-XI in the amounts of acetone indicated above and Reactant B-I in the amounts of acetone indicated above were charged to a reaction vessel and heated to reflux about 60° C. TEA ws added and the reaction mixture so formed was heated at about 60° C. until about 1.1 ester groups per Reactant B-I molecule have formed.

Water (9.0 gm) was then added and the reaction mixture was held at about 60° C. for one hour to form a varnish. Then slowly with stirring, a solution of:
Solvent B: 45.3
DMEA: 5.1
Water: 181.4
was added to 307.0 grams of the varnish to form an aqueous dispersion. A sample of the dispersion was cast at 5 mils wet on a glass plate. The sample air dried to a glossy, clear film.

The dispersion was subject to vacuum distillation at 26 inches of Hg to remove organic solvents until the solids content had reached 27.4 weight percent. A sample of the final dispersion so produced of 27.4% total solids was cast 5 mils wet on a glass plate. It air dried to a glossy, clear film.

EXAMPLE 34

A procedure similar to that shown in Examples 25, 26 and 27 was carried out with the following formulation:

| Material | Amount (Grams) |
|---|---|
| Reactant A-I | 100 |
| Reactant B-VIII[1] | 20 |
| Acetone | 120 |
| TEA | 1.6 |

[1] Reactant B-VIII is a maleated polybutadiene resin having a number average molecular weight of about 1150 and 1.7 anhydride equivalents/molecule. It is commercially available as "BN-1015".

The Reactants were dissolved in the acetone, charged to a reaction vessel, and heated to reflux temperature of about 60° C. The TEA was added and the mixture was held at reflux for about 58 minutes, until about 0.3 ester groups per Reactant B-VIII molecule had formed. Then 10 gm water was charged and the reaction mixture was held about 1 hour at a temperature of 60° C.

Then 30 gm of the varnish so formed was mixed with:
24.8 gm water
5.0 gm Solvent B
0.2 gm of DMEA
using an ultrasonic device described in Example 31 to produce an aqueous dispersion. The dispersion was cast at 5 mils wet on a glass plate and air dried to a clear gloss film.

EXAMPLE 35

The varnish of Example I has the following composition:

| | Percent by Weightk |
|---|---|
| Block copolymer composition | 60.0 |
| Solvent (Solvent B, acetone, trace of TEA) | 40.0 |

To 128.3 gm of the varnish was added with mixing 65.7 gm of a 35% solids solution of a terpolymer of 86 wt. % vinyl chloride, 13 wt. % vinyl acetate and 1 wt. % maleic acid having a molecular weight of about 15,000 to MEK solvent.
A solution of:

| Solvent B | 26.0 |
|---|---|
| DMEA | 8.0 |
| Water | 226.0 |
| | 260.0 | was added slowly with agitation. The resultant aqueous dispersion was cast as a film on a glass plate. The film air dried to a slightly hazy appearance and was judged to be a tough film rated by fingernail scratching.

EXAMPLE 36

The aqueous dispersion of Example I has the following composition:

| | Percent by Weight |
|---|---|
| Block copolymer composition | 24.0 |
| Solvent | 23.0 |
| Solvent B and trace acetone | 2.0 |
| Amine (DMEA and trace of TEA) | |
| Water | 51.0 |
| | 100.0 |

The following coating formulation were prepared using the above dispersion.

| | Formulations (Grams) | | | | |
|---|---|---|---|---|---|
| | A | B | C | D | E |
| Dispersion of Ex. I (24% NV)* | 50.0 | 50.0 | 50.0 | 50.0 | 50.0 |
| "NeoRez R943"** (27% NV)* | — | 4.4 | 22.2 | — | — |
| "NeoRez R960"** (33% NV)* | — | — | — | 3.6 | 18.2 |

*"NV" denotes non-volatile components
**"NeoRez" resins are waterborne dispersions of urethane elastomers.

Formulations A, B, C, D and E were cast on steel "Q Panels" to yield dry film thickness of about 0.9 mils. All treated panels were baked 10 minutes at 300° F. Forward impact values were determined on the treated panels in accordance with ASTM D-2744 with results as follows:

| Panel Treated with Formulation | Impact Values (in./lbs.)* |
|---|---|
| A | 12 (control) |
| B | 20 |
| C | 160 |
| D | 12 |
| E | 28 |

*highest value passing test.

Formulations A, C, and E were applied by wire wound rod to poly(ethylene terephthalate) film to yield dry film thickness of about 0.2 mils. The formulations were dried two minutes at 250° F. Adhesion of the treated film was rated by the Scotch Tape #610 test (ASTM D-3359) with the following results.

| Film Treated with Formulation | #610 Test Rating |
|---|---|
| A | Fair (about ⅓ of film removed under tape.) |
| C | Very good (less than 20% film removed.) |
| E | Very good (less than 20% film removed.) |

Formulations A, C, and E were prepared as inks by blending 4.2 of "Tint-Ayd" WE-2228, a phthalo blue pigment dispersion, into Formulations A, C, and E, respectively. The inks were cast on aluminum foil and on plasticized vinyl film to about 0.2 mils dry film. The inks were force dried one minute at 90° C. Adhesion was tested by the "Scotch Tape" #610 test. The results were as follows:

| Ink From Formulation | #610 Test | |
|---|---|---|
| | Vinyl Film | Aluminum Foil |
| A | No loss of Adhesion | >50% Loss of Adhesion |
| B | No Loss of Adhesion | 10% Loss of Adhesion |
| C | No Loss of Adhesion | 20% Loss of Adhesion |

EXAMPLE 37

The aqueous dispersion of Example I was blended with several different acrylic and vinyl acrylic latexes and a phenolic resin waterborne dispersion as follows:

| | Amounts (Grams) | | Appearance of Dry Film (#) | |
|---|---|---|---|---|
| | A | B | A | B |
| Aqueous Dispersion of Example I (25% solids) | 62.5 | 41.6 | | |
| Acrylic Latex* | | | | |
| UCAR-4510 (42%) | 11.9 | 23.9 | Clear | Clear |
| UCAR-4550 (45%) | 11.1 | 22.2 | Clear | Clear |
| UCAR-4620 (45%) | 11.1 | 22.2 | Clear | Clear |
| UCAR-4630 (48%) | 10.4 | 20.8 | Clear | Clear |
| UCAR-503 (58%) | 8.6 | 17.2 | Sl. Haze | Mod. Haze |
| UCAR-505 (55%) | 9.1 | 18.2 | Sl. Haze | Mod. Haze |
| UCAR-508 (53%) | 9.4 | 18.8 | Sl. Haze | Sl. Haze |
| UCAR 515 (53%) | 9.4 | 18.8 | Sl. Haze | Sl. Haze |
| UCAR 518 (50%) | 10.0 | 20.0 | Sl. Haze | Sl. Haze |
| UCAR-4358 (45%) | 11.1 | 22.2 | Sl. Haze | Mod. Haze |
| UCAR Phenoic Dispersion BKUA-2370 (44%) | 11.4 | 22.8 | Clear | Hazy |

*Percent total solids in acrylic latex
(#) "Sl" denotes slight and "Mod" denotes moderate.

The above blends were case on glass to yield about 0.9 mil dry film thickness. After an air dry period of about 20 minutes, the films were force dried about 30 minutes at 60° C. All films were examined for clarity with results reported above. All films formed tough films that were resistant to fingernail scratching.

EXAMPLE 38

A solution of the following materials was charged to a reaction vessel:
Reactant A-1: 216.5 grams
Acetone: 272.0 grams
Water: 11.5 grams
Reactant B-1 (43.3 grams) was dissolved in the solution and the mixture brought to reflux, about 60° C. Then 3.1 gm of TEA was charged and the mixture was held at reflux for 75 minutes. Then, a mixture of 399 gm water, 40 gm Solvent B and 11 gm dimethylethanolamine was added slowly with agitation. The mixture was then stripped at reduced pressure to produce an aqueous dispersion having a final non-volatile content of 43% by weight.

When cast on glass, the aqueous dispersion air dried to form a clear coating that was resistant to fingernail scratching.

EXAMPLE 39

37.5 grams of a water-reducible alkyd resin having 75% solids by weight in a mixture of Solvent B and butanol, an acid value of 37, a weight per gallon of 8.56 lbs. and a Gardner-Holt viscosity of Z5+ [commercially sold under the designation "Kelsol 3909"] was thoroughly mixed while 30.0 grams of a 2.5% aqueous solution of ammonium hydroxide were added, which resulted in a uniform emulsion ("Alkyd Emulsion"). Then 21 grams of the varnish of Example 1 were mixed with 28.5 grams of a 2.5% aqueous solution of ammonium hydroxide, to provide a uniform emulsion ("Varnish Emulsion"). The Alkyd Emulsion and the Varnish Emulsion were mixed thoroughly. When the mixture of emulsions was applied as a 5-mil (wet) film on a glass plate and allowed to dry, it formed a dry film faster than the Alkyd Emulsion alone.

EXAMPLE 40

37.5 grams of a water-reducible alkyd resins having: 75% solids by weight in a mixture of Solvent B and butanol, an acid value of 37, a weight per gallon of 8.56 lbs, and a Gardner-Holt viscosity of Z5+ [commercially sold under the designation "Kelsol 3909"] was thoroughly mixed with 21 grams of the varnish of Example 1 to form a mixture having 70 parts by weight of the alkyd resin and 30 parts by weight of varnish. After the mixture was mixed homogenously, 58.5 grams of a 2.5% aqueous solution of ammonium hydroxide were added with continuous agitation, resulting in a homogeneous emulsion. When a 5-mil (wet) film of this emulsion was applied on a glass plate and allowed to dry, it formed a dry film faster than a control alkyd resin emulsion prepared in a similar manner except that it contained no varnish.

EXAMPLE 41

To a 500 cc reaction flask fitted with heating mantle, agitator, reflux condenser, and thermocouple were charged with 333 g. of a 15% solution of Reactant A-IX in cyclohexanone and then with 10 gm of Reactant B-VII. After dissolving the Reactant B-VII with heat and agitation, 3.0 gm TEA were added and agitation continued at 82°-83° C. for 2 hours 37 minutes. The product was quenched with 4.3 gm water (10 times the anhydride equivalents) and heating was continued for 4 hours at 60° C. at which point vacuum distillation was used to remove 14 gm of distillate (to strip residual water). Analysis showed that the anhydride level was 37% (measured as acid) and that 9% of the acid groups had esterified (0.8 ester groups per Reactant B-VII molecule). The varnish so produced was stable for over five months at room temperature.

Summary

Reactant A-IX: 100
Reactant B-VII: 20
TEA: 6
Cyclohexanone: 566
Reaction Time @ 82°-83° C., mins.: 157
Water Quenchant, g.: 8.6
Ester Groups per Reactant A-IX molecule: 3.6
Ester Groups per Reactant B-VII molecule: 0.8

This varnish was tested as an improved iron oxide pigment dispersant for magnetic recording tape. The varnish was blended in equal amounts (solids basis) with Reactant A-IX and tested against Reactant A-IX for gloss using 2, 1, 0.5 and 0.0% "GAFAC RE-610" (an alkylphenol ethoxylate phosphate surfactant) in the formulation. The results showed significantly improved gloss with the varnish. The varnish was also tested in a formulation containing both Reactant IX and "Estane 5701" (a commonly used polyurethane component of magnetic tape binder compositions). The formulations used (mixed in cyclohexanone) contained:
100 gms gamma-ferric oxide ("P Ferrox 2228-HC"),
20 gms polymer(s) and
0.0–2% "GAFAC RE-160".
The results were as follows:

| | | Gloss, % | | |
|---|---|---|---|---|
| Amount of GAFAC | Reactant A-IX (Control) | Reactant A-IX/ Hydrolyzed B-VIII (9/1#) (Control) | Reactant IX/Varnish (1/1#) | "Estane 5701"/ Varnish/ Reactant A-IX (2/2/1#) |
| 2% | 1000 | — | 103 | — |
| 1% | 30–50 | 53 | 90 | 90 |
| 0.5% | — | — | 95 | — |
| 0.0% | 20–30 | — | 90 | 90 |

Weight Ratio

EXAMPLE 42

A stable aqueous dispersion was prepared with the following materials and procedure:

| Material | Amount (Grams) |
|---|---|
| Reactant A-IX | 75 |
| MEK | 225 |
| Reactant B-I | 15 |
| TEA | 2.0 |

A reaction mixture containing the above materials was heated for one hour at reflux (80° C.) at which point a varnish containing a composition having 1.0 ester group per Reactant B-I molecule had formed. To this varnish was then added a solution of:

| Material | Amount (Grams) |
|---|---|
| Solvent A | 35 |
| Water | 235 |
| DMEA | 4 |

The MEK and some of the water were removed by vacuum distillation to yield an aqueous dispersion with the following properties:
Solids Content: 36.0%
Viscosity: 705 cP
pH: 7.4
The dispersion dried to a clear, glossy film.

EXAMPLE 43

An aqueous dispersion was prepared as follows:

| Reaction Mixture | |
|---|---|
| Component | Amount |
| Reactant A-XV | 60.0 g. |
| Reactant B-I | 6.0 g. |
| Acetone | 200.0 g. |
| TEA | 1.5 g. |

A solution of Reactant A-XV and Reactant B-I in acetone was charged to a flask and brought to reflux (about 59° C.). The TEA catalyst was added and the reaction mixture was held at reflux for about 45 minutes to generate a varnish containing a composition having about 0.95 ester groups per Reactant B-I molecule. The reaction mixture was cooled to about 50° C. Then a solution comprising Solvent B (30.0 g.), DMEA (1.3 g.) and water (120.0 g.) was added slowly with stirring. A sample of the diluted reaction mixture was cast on glass. The sample air dried to a clear film. Then the diluted reaction mixture was subjected to vacuum distillation to remove essentially all of the acetone. The resultant aqueous dispersion had a solids content of about 29% by weight. A 5 mil wet film was cast on glass. The film was air dried to yield a tough film, judged by finger nail scratching.

Reactant A-XV is a quadripolymer of about 80 weight % vinyl chloride, 6 weight % vinyl acetate, 13 weight % vinyl alcohol and 1 weight % maleic acid, having a number average molecular weight of about 23,000.

What is claimed is:

1. A process for preparing water-dispersible, block copolymer coating compositions, which process comprises:
   (1) forming a reaction mixture comprising (i) a water-indispersible, film-forming, organic polymer having an average of at least three hydroxyl groups per molecule (hereinafter referred to as "Reactant A"), (ii) an organic polymer, other than an ethylene-maleic anhydride copolymer, which has an average of at least two carboxylic acid anhydride groups per molecule and which, after hydrolysis and neutralization of at least some of the anhydride groups with a base, is dispersible in water, (hereinafter referred to as "Reactant B"), and (iii) an esterification catalyst;
   (2) reacting hydroxyl groups of Reactant A and anhydride groups of Reactant B to form ester groups and carboxy groups, such reaction being conducted to the extent necessary to produce a film-forming composition which, after neutralization of at least some of the carboxy groups with a base, is dispersible in a primarily aqueous medium having a pH over 5; and
   (3) controlling said reaction to prevent gelation of the composition by incorporating in said reaction mixture water or a low molecular weight organic compound containing one or two groups reactive with said anhydride groups.

2. A process as claimed in claim 1 wherein the reaction mixture also contains an organic solvent and the product in said composition is dissolved in said solvent to form a varnish.

3. A process as claimed in claim 2 wherein the organic solvent is a water soluble dialkyl ketone.

4. A process as claimed in claim 1 wherein Reactant A is a vinyl chloride/vinyl acetate/hydroxyalkyl acrylate terpolymer having 2 to about 6 carbons in the hydroxyalkyl moiety.

5. A process as claimed in claim 1 wherein Reactant B is a styrene/maleic anhydride copolymer.

6. A process as claimed in claim 2 wherein the organic solvent is partially stripped from the varnish and exchanged for a monoalkyl glycol ether having 1 to about 6 carbons in the alkyl moiety.

7. A process as claimed in claim 6 wherein the stripped organic solvent is acetone and the monoalkyl glycol ether is monobutyl ether of ethylene glycol.

8. A process as claimed in claim 1 wherein the catalyst is a trialkylamine having 1 to about 4 carbons in the alkyl moiety.

9. A process as claimed in claim 2 wherein the block copolymer varnish is contacted with an aqueous solution containing a base and an organic solvent whereby a stable aqueous dispersion is obtained.

10. A process as claimed in claim 9 wherein the base is dimethylethanolamine and the organic solvent is an alkyl glycol ether having 2 to about 4 carbons in the alkyl moiety.

11. A process as claimed in claim 9 wherein the aqueous dispersion is mixed with a water-soluble crosslinking agent.

12. A process as claimed in claim 11 wherein the crosslinking agent is hexamethoxymethylmelamine.

13. A process as claimed in claim 1 wherein the reaction is controlled to prevent gelation by incorporating water in said reaction mixture.

14. A process as claimed in claim 1 wherein the reaction is controlled to prevent gelation by incorporating in the reaction mixture a low molecular weight organic compound having a molecular weight no greater than 200.

15. A process as claimed in claim 1 wherein the reaction is controlled to prevent gelation by incorporating in the reaction mixture a low molecular weight organic compound having a molecular weight no greater than 120.

16. A process as claimed in claim 1 wherein the reaction is controlled to prevent gelation by incorporating in the reaction mixture a monohydric alcohol.

17. A block copolymer coating composition comprising:
(A) a water-indispersible, film-forming, organic polymer component having an average of at least three hydroxyl groups per molecule (hereinafter referred to as "Component I") and
(B) an organic polymer component, other than a component derived from an ethylene-maleic anhydride copolymer, which has an average of at least two carboxylic acid groups per molecule and which, after neutralization of at least some of the carboxy groups with a base, is dispersible in water (hereinafter referred to as "Component II"),
said composition: (a) containing an average of from 0.1 to 3.1 ester group(s) per mole of Component I, which ester group(s) link at least some of Component I to at least some of Component II; and (b) being dispersible in a primarily aqueous medium having a pH over 5 after neutralization of at least some of the carboxy groups with a base.

18. A composition as claimed in claim 17 wherein Component I is a hydrophilic addition polymer having a number average molecular weight from 500 to 35,000 or 50,000.

19. A composition as claimed in claim 17 wherein Component I is a hydrophilic addition polymer having a number average molecular weight from 3,000 to 35,000 or 50,000.

20. A composition as claimed in claim 17 wherein Component I is a hydrophobic addition polymer having a number average molecular weight from 500 to 20,000.

21. A composition as claimed in claim 17 wherein Component I is a hydrophobic addition polymer having a number average molecular weight from 3,000 to 15,000.

22. A composition as claimed in claim 17 wherein Component I is an epoxy polymer or a phenoxy polymer having a number average molecular weight from 500 to 50,000.

23. A composition as claimed in claim 17 wherein Component I is an epoxy polymer or a phenoxy polymer having a number average molecular weight from 3,000 to 40,000.

24. A composition as claimed in claim 17 wherein Component II has a number average molecular weight from 300 to 30,000.

25. A composition as claimed in claim 17 wherein Component II has a number average molecular weight from 800 to 2,500.

26. A solution comprising a composition as claimed in claim 17 and a solvent therefor selected from the group consisting of ketone, hydrocarbons, esters and chlorinated hydrocarbons.

27. A solution comprising a composition as claimed in claim 17 and a solvent therefor selected from the group consisting of acetone, methylethyl ketone, ethylpropyl ketone, methylbutyl ketone and ethylbutyl ketone.

28. A solution comprising a composition as claimed in claim 17 and a solvent therefor selected from the group consisting of glycols and ethers.

29. A solution comprising a composition as claimed in claim 17 and a solvent therefor selected from the group consisting of monobutylethylene glycol, monopropylethylene glycol, monoethylethylene glycol, monomethylethylene glycol, monomethyldiethylene glycol and monoethyldiethylene glycol.

30. A composition as claimed in claim 17 containing an average of from 0.5 to 2 ester groups per molecule of Component I.

31. A water-dispersible salt-containing coating composition, which composition is a block copolymer composition comprising:
(A) a water-dispersible, film-forming, organic polymer component having an average of at least three hydroxyl groups per molecule (hereinafter referred to as "Component I"), and
(B) a water-dispersible organic polymer component, other than a component derived from an ethylene-maleic anhydride copolymer, which has an average per molecule of at least two salt groups derived from carboxylic acid groups and a base (hereinafter referred to as "Component II"),
said composition containing an average of from 0.1 to 3.1 ester group(s) per mole of Component I, which ester group(s) link at least some of Component I to at least some of Component II.

32. An aqueous dispersion comprising a major amount of water and minor amount of a salt-containing coating composition as claimed in claim 31.

33. An aqueous dispersion comprising a major amount of water, a minor amount of composition as claimed in claim 31 and a minor amount of an organic solvent for said compositions.

34. An aqueous dispersion containing from 15 to 55 weight percent of a composition as claimed in claim 31, from 40 to 84 weight percent of water and from 0 to 35 weight percent of an organic solvent for said composition.

35. An aqueous dispersion containing from 20 to 35 weight percent of a composition as claimed in claim 31, from 50 to 70 weight percent of water and from 5 to 25 weight percent of an organic solvent for said composition.

36. A curable mixture comprising a composition as claimed in claim 31 and a cross-linking agent.

37. A curable mixture as claimed in claim 36 wherein the cross-linking agent is a melamine-formaldehyde resin, a urea-formaldehyde resin or a polyaziridine resin.

38. A curable mixture that is an aqueous dispersion comprising a major amount of water and minor amounts of a composition as claimed in claim 31 and a cross-linking agent.

39. A curable mixture that is an aqueous dispersion comprising a major amount of water and minor amounts of a composition as claimed in claim 31, a cross-linking agent for said composition and an organic solvent for said composition.

40. A solid substrate coated with a coating produced thereon by curing a mixture as claimed in claim 36.

41. A solid substrate as claimed in claim 40 where the substrate is a metal.

42. A process for coating solid substrate which comprises applying to the substrate a film of a curable mixture as defined in claim 36 and curing said mixture on said substrate.

43. A dispersion as claimed in claim 32 wherein the dispersed particles have an average particle size less than 5 microns and less than ten percent by weight of the salt-containing coating composition is filtered out with a 325 mesh screen.

44. An aqueous dispersion as claimed in claim 32 wherein the dispersed particles have an average particle size less than one micron and less than two percent by weight of the salt-containing composition is filtered out with a 325 mesh screen.

45. A dispersion as claimed in claim 32 wherein the dispersed particles have an average particle size less than five microns and less than ten percent by weight of the salt-containing coating composition is filtered out with a 325 mesh screen.

46. An aqueous dispersion as claimed in claim 32 wherein the dispersed particles have an average particle size less than one micron and less than two percent by weight of the salt-containing composition is filtered out with a 325 mesh screen.

47. A dispersion as claimed in claim 32 having a pH from six to nine.

48. A dispersion as claimed in claim 32 having a pH from seven to eight.

49. A process as claimed in claim 1 wherein Reactant I and Component I form basic aqueous dispersions wherein the dispersed particles have an average particle size greater than five microns or more than ten percent by weight of Reactant I or Component I is filtered out with a 325 mesh screen and wherein Reactant II, Component II and the block copolymer coating composition form a basic solution wherein the dispersed particles have an average particle size less than five microns and less than ten percent by weight of the salt formed from Reactant B, Component II or the composition is filtered out with a 325 mesh screen.

50. A process as claimed in claim 1 wherein Reactant A is a vinyl chloride/vinyl acetate/vinyl alcohol terpolymer.

51. A process as claimed in claim 1 wherein Reactant A is a vinyl chloride/vinyl acetate/vinyl alcohol/maleic acid quadripolymer.

* * * * *